(12) United States Patent
Yamagata et al.

(10) Patent No.: US 10,389,910 B2
(45) Date of Patent: Aug. 20, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Tatsuhiro Yamagata, Inagi (JP); Yugo Mochizuki, Kawasaki (JP); Kouta Murasawa, Yokohama (JP); Toshiki Miyazaki, Tokyo (JP); Masao Kato, Kawasaki (JP); Okinori Tsuchiya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/961,284

(22) Filed: Apr. 24, 2018

(65) Prior Publication Data

US 2018/0332191 A1 Nov. 15, 2018

(30) Foreign Application Priority Data

May 12, 2017 (JP) .................................. 2017-095940

(51) Int. Cl.
*H04N 1/00* (2006.01)
*H04N 1/405* (2006.01)
*H04N 1/409* (2006.01)

(52) U.S. Cl.
CPC ....... *H04N 1/4057* (2013.01); *H04N 1/00779* (2013.01); *H04N 1/4051* (2013.01); *H04N 1/4092* (2013.01)

(58) Field of Classification Search
CPC .. H04N 1/4057; H04N 1/4051; H04N 1/4092; H04N 1/00779
See application file for complete search history.

(56) References Cited

U.S. PATENT DOCUMENTS

| 6,738,160 B1 | 5/2004 | Kato et al. |
| 7,099,046 B2 | 8/2006 | Yamada et al. |
| 7,312,901 B2 | 12/2007 | Yamada et al. |

(Continued)

FOREIGN PATENT DOCUMENTS

| JP | 2016-015596 A | 1/2016 |
| JP | 2016-155373 | 9/2016 |

OTHER PUBLICATIONS

Japanese Office Action dated May 28, 2019 during prosecution of related Japanese application No. 2017-095940. (English-language machine translation included.).

*Primary Examiner* — Christopher Wait
(74) *Attorney, Agent, or Firm* — Venable LLP

(57) ABSTRACT

The present invention provides an image processing apparatus which employs a dither method capable of printing a thin line of desired density without any break irrespective of printing conditions. The first threshold changing unit changes part of threshold values in a threshold matrix to generate a first threshold matrix so as to increase the number of dots to be printed in a specific pixel area. The second threshold changing unit changes part of threshold values in the threshold matrix to generate a second threshold matrix such that the number of dots to be printed in a specific pixel area is smaller than the case of changing a threshold value by the first threshold changing unit. A determining unit determines whether a threshold value in the threshold matrix is to be changed by the first threshold changing unit or by the second threshold changing unit.

12 Claims, 19 Drawing Sheets

(56) References Cited

U.S. PATENT DOCUMENTS

| | | |
|---|---|---|
| 7,548,346 B2 | 6/2009 | Yamada et al. |
| 7,672,011 B2 | 3/2010 | Kato et al. |
| 7,855,809 B2 | 12/2010 | Kato et al. |
| 7,859,723 B2 | 12/2010 | Yamada et al. |
| 7,965,418 B2 | 6/2011 | Yamada et al. |
| 8,619,319 B2 | 12/2013 | Tsuchiya et al. |
| 8,830,530 B2 | 9/2014 | Sano et al. |
| 9,087,291 B2 | 7/2015 | Hori et al. |
| 9,092,720 B2 | 7/2015 | Nakagawa et al. |
| 9,210,292 B2 | 12/2015 | Miyake et al. |
| 9,592,689 B2 | 3/2017 | Yanai et al. |
| 9,636,937 B2 | 5/2017 | Ikeda et al. |
| 9,661,181 B2 | 5/2017 | Kato et al. |
| 9,704,074 B2 | 7/2017 | Kato et al. |
| 9,807,281 B2 | 10/2017 | Kajiwara et al. |
| 9,815,275 B2 | 11/2017 | Yanai et al. |
| 9,876,940 B2 | 1/2018 | Yamada et al. |
| 2016/0241740 A1 | 8/2016 | Nakagawa et al. |
| 2018/0020125 A1 | 1/2018 | Kajiwara et al. |
| 2018/0091699 A1 | 3/2018 | Yamada et al. |

FIG.8A

| 24 | 138 | 55 | 230 | 183 | 66 | 238 | 189 | 75 | 25 |
|---|---|---|---|---|---|---|---|---|---|
| 215 | 180 | 12 | 158 | 88 | 207 | 115 | 4 | 155 | 215 |
| 121 | 71 | 248 | 79 | 45 | 26 | 168 | 59 | 250 | 43 |
| 157 | 33 | 134 | 189 | 220 | 143 | 229 | 93 | 135 | 109 |
| 196 | 224 | 84 | 7 | 120 | 71 | 183 | 16 | 204 | 66 |
| 17 | 60 | 164 | 209 | 53 | 246 | 105 | 39 | 162 | 244 |
| 112 | 251 | 98 | 145 | 31 | 172 | 139 | 215 | 80 | 121 |
| 215 | 175 | 23 | 199 | 235 | 88 | 10 | 190 | 54 | 224 |
| 77 | 50 | 133 | 106 | 116 | 59 | 126 | 232 | 26 | 145 |
| 157 | 192 | 228 | 0 | 178 | 208 | 151 | 99 | 169 | 86 |

| 24 | 138 | 55 | 230 | 183 | 66 | 238 | 189 | 75 | 25 |
|---|---|---|---|---|---|---|---|---|---|
| 215 | 180 | 12 | 158 | 88 | 207 | 115 | 4 | 155 | 215 |
| 121 | 71 | 79 | 79 | 45 | 26 | 168 | 59 | 250 | 43 |
| 157 | 33 | 134 | 189 | 220 | 143 | 229 | 93 | 135 | 109 |
| 196 | 224 | 7 | 7 | 120 | 71 | 183 | 16 | 204 | 66 |
| 17 | 60 | 164 | 209 | 53 | 246 | 105 | 39 | 162 | 244 |
| 112 | 251 | 98 | 145 | 31 | 172 | 139 | 215 | 80 | 121 |
| 215 | 175 | 23 | 199 | 235 | 88 | 10 | 190 | 54 | 224 |
| 77 | 50 | 106 | 106 | 116 | 59 | 126 | 232 | 26 | 145 |
| 157 | 192 | 0 | 0 | 178 | 208 | 151 | 99 | 169 | 86 |

| 24 | 138 | 55 | 345 | 183 | 66 | 238 | 189 | 75 | 25 |
|---|---|---|---|---|---|---|---|---|---|
| 215 | 180 | 12 | 237 | 88 | 207 | 115 | 4 | 155 | 215 |
| 121 | 71 | 119 | 119 | 45 | 26 | 168 | 59 | 250 | 43 |
| 157 | 33 | 134 | 284 | 220 | 143 | 229 | 93 | 135 | 109 |
| 196 | 224 | 11 | 11 | 120 | 71 | 183 | 16 | 204 | 66 |
| 17 | 60 | 164 | 314 | 53 | 246 | 105 | 39 | 162 | 244 |
| 112 | 251 | 98 | 218 | 31 | 172 | 139 | 215 | 80 | 121 |
| 215 | 175 | 23 | 299 | 235 | 88 | 10 | 190 | 54 | 224 |
| 77 | 50 | 133 | 159 | 116 | 59 | 126 | 232 | 26 | 145 |
| 157 | 192 | 0 | 0 | 178 | 208 | 151 | 99 | 169 | 86 |

801

| PRINT MODE | PAPER DISTANCE (μm) | SCANNING SPEED (inch/sec) |
|---|---|---|
| A | 600 | 50 |
| B | 900 | 50 |
| C | 1200 | 50 |
| D | 900 | 40 |
| E | 900 | 60 |

FIG.17

| PRINT MODE | PAPER DISTANCE (μm) | SCANNING SPEED (inch/sec) | NEW-THRESHOLD PROCESSING |
|---|---|---|---|
| A | 600 | 50 | APPLIED |
| B | 900 | 50 | APPLIED |
| C | 1200 | 50 | NOT APPLIED |
| D | 900 | 40 | APPLIED |
| E | 900 | 60 | NOT APPLIED |

FIG.19

IMAGE PROCESSING APPARATUS, IMAGE PROCESSING METHOD, AND STORAGE MEDIUM

BACKGROUND OF THE INVENTION

Field of the Invention

The present invention relates to an image processing technique of performing quantization process for an input image using a threshold matrix.

Description of the Related Art

In an inkjet printing apparatus which prints an image by determining whether to print (1) or not to print (0) a dot using pseudo halftone processing, break may occur on a thin line that corresponds to the width of one dot. This is because that there may be a case where a dot, on a thin line of intermediate density such as a grey color, is determined not to be printed (0) in quantization even on a pixel corresponding to the position of a thin line. Further, it is known that, even with the intermediate density of the same level, the above break is likely to be prominent in the case of using a dither method as quantization process rather than the case of using an error diffusion method.

FIG. 1 is a diagram showing an example of printing a thin line of a one-dot width using each processing of the error diffusion method (ED) and the dither method. In FIG. 1, a thin line 10 is a thin line obtained by applying the error diffusion method, and a thin line 11 is a thin line obtained by applying the dither method by using a threshold matrix having a blue noise characteristic. The thin line 10 and thin line 11 have been processed in accordance with input signals having the same intermediate density, and the number of dots as their output results is almost the same. However, the thin line 10 has dots and spaces aligned substantially in a uniform manner and break on the thin line is unlikely to be recognized, whereas the thin line 11 has dots and spaces aligned unevenly and break thereon is likely to be recognized. The break of such a thin line is not preferable because the state of line connection may be unclear in the case of printing electric circuit drawings in particular.

With respect to the above problem, Japanese Patent Laid-Open No. 2016-015596 discloses quantization process for making break on a thin line less visible while employing the dither method. To be more specific, a pixel position corresponding to a thin line is selected within a threshold matrix prepared beforehand to change its threshold to a smaller value. Due to this, the probability of an input density signal being larger than the threshold value becomes higher and the provability of printing dots becomes higher, thereby causing the break less visible.

Incidentally, if printing conditions change in accordance with a printing mode or the like, an optical density representing one dot on a print medium also changes. Particularly, in a finer image such as a thin line, the size of a dot significantly affects the density in appearance.

However, in Japanese Patent Laid-Open No. 2016-015596, a method of adding a dot in a thin line area is specified uniformly irrespective of printing conditions such as the printing mode. Accordingly, the number of dots to be added may be too large or too small depending on the printing mode, and thus, there may be a risk of great deviation from the intermediate density originally designated by a density signal.

SUMMARY OF THE INVENTION

The present invention is made to resolve the above problem. Accordingly, an object of the present invention is to provide an image processing apparatus and an image processing method which employs a dither method capable of printing a thin line of desired density without any break irrespective of printing conditions such as a printing mode.

According to a first aspect of the present invention, there is provided an image processing apparatus comprising: a comparing unit configured to compare a signal value of a pixel with a threshold value at a position corresponding to the pixel in a threshold matrix that is composed of different threshold values arranged therein, to set whether to print or not to print a dot for the pixel, a first threshold generation unit configured to generate a first threshold value corresponding to a specific pixel area by changing part of threshold values corresponding to the specific pixel area of a fiducial threshold matrix based on the signal value such that the number of dots to be printed for the specific pixel area is greater than a case of using threshold values of the fiducial threshold matrix; a second threshold generation unit configured to generate a second threshold value corresponding to the specific pixel area by changing part of threshold values of the fiducial threshold matrix based on the signal value such that the number of dots to be printed for the specific pixel area is greater than the case of using threshold values of the fiducial threshold matrix and is smaller than a case of using the first threshold value; and a determination unit configured to determine whether the comparing unit sets printing or not printing a dot using the first threshold value or the comparing unit sets printing or not printing a dot using the second threshold value for the specific pixel area.

According to a second aspect of the present invention, there is provided an image processing apparatus comprising: a comparing unit configured to compare a signal value of a pixel with a threshold value at a position corresponding to the pixel in a threshold matrix that is composed of different threshold values arranged therein, to set whether to print or not to print a dot for the pixel, a first threshold generation unit configured to generate a first threshold value corresponding to a specific pixel area by changing part of threshold values corresponding to the specific pixel area of a fiducial threshold matrix based on the signal value such that the number of dots to be printed for the specific pixel area is greater than a case of using threshold values of the fiducial threshold matrix; a second threshold generation unit configured to prepare a threshold value of the fiducial threshold matrix as a second threshold value of a second threshold matrix; and
a determination unit configured to determine whether the comparing unit sets printing or not printing a dot using the first threshold value or the comparing unit sets printing or not printing a dot using the second threshold value for the specific pixel area.

According to a third aspect of the present invention, there is provided an image processing method comprising the steps of: comparing a signal value of a pixel with a threshold value at a position corresponding to the pixel in a threshold matrix that is composed of different threshold values arranged therein, to set whether to print or not to print a dot for the pixel; generating a first threshold value corresponding to a specific pixel area by changing part of threshold values corresponding to the specific pixel area of a fiducial threshold matrix based on the signal value such that the number of dots to be printed for the specific pixel area is greater than a case of using threshold values of the fiducial threshold matrix; generating a second threshold value corresponding to the specific pixel area by changing part of threshold values of the fiducial threshold matrix based on the signal value such that the number of dots to be printed for the specific pixel area is greater than the case of using threshold values of the fiducial threshold matrix and is smaller than a case of using the first threshold value; and determining whether the comparing step sets printing or not printing a dot using the first threshold value or the comparing unit sets printing or not printing a dot using the second threshold value for the specific pixel area.

According to a fourth aspect of the present invention, there is provided an image processing method: comparing a signal value of a pixel with a threshold value at a position corresponding to the pixel in a threshold matrix composed of different threshold values arranged therein, to set whether to print or not to print a dot for the pixel; generating a first threshold value corresponding to a specific pixel area by changing part of threshold values corresponding to the specific pixel area of a fiducial threshold matrix based on the signal value such that the number of dots to be printed for the specific pixel area is greater than a case of using threshold values of the fiducial threshold matrix; generating a second threshold value by preparing a threshold value of the fiducial threshold matrix as a second threshold value of a second threshold matrix; and determining whether the comparing step sets printing or not printing a dot using the first threshold value or the comparing step sets printing or not printing a dot using the second threshold value for the specific pixel area.

According to a fifth aspect of the present invention, there is provided a non-transitory computer-readable storage medium storing a program for causing one or more processors to perform as an image processing apparatus, the apparatus comprising: a comparing unit configured to compare a signal value of a pixel with a threshold value at a position corresponding to the pixel in a threshold matrix that is composed of different threshold values arranged therein, to set whether to print or not to print a dot for the pixel a first threshold generation unit configured to generate a first threshold value corresponding to a specific pixel area by changing part of threshold values corresponding to the specific pixel area of a fiducial threshold matrix based on the signal value such that the number of dots to be printed for the specific pixel area is greater than a case of using threshold values of the fiducial threshold matrix; a second threshold generation unit configured to generate a second threshold value corresponding to the specific pixel area by changing part of threshold values of the fiducial threshold matrix based on the signal value such that the number of dots to be printed for the specific pixel area is greater than the case of using threshold values of the fiducial threshold matrix and is smaller than a case of using the first threshold value; and a determination unit configured to determine whether the comparing unit sets printing or not printing a dot using the first threshold value or the comparing unit sets printing or not printing a dot using the second threshold value for the specific pixel area.

Further features of the present invention will become apparent from the following description of exemplary embodiments with reference to the attached drawings.

BRIEF DESCRIPTION OF THE DRAWINGS

FIGS. 8A to 8C are diagrams showing states in which new threshold values are determined in a threshold matrix;

FIG. 17 is a table showing an example of printing modes that can be adapted in the present invention;

FIG. 19 is a table showing correlation between printing modes and new-threshold processing being applied or not applied.

DESCRIPTION OF THE EMBODIMENTS

First Embodiment

Figure 1:
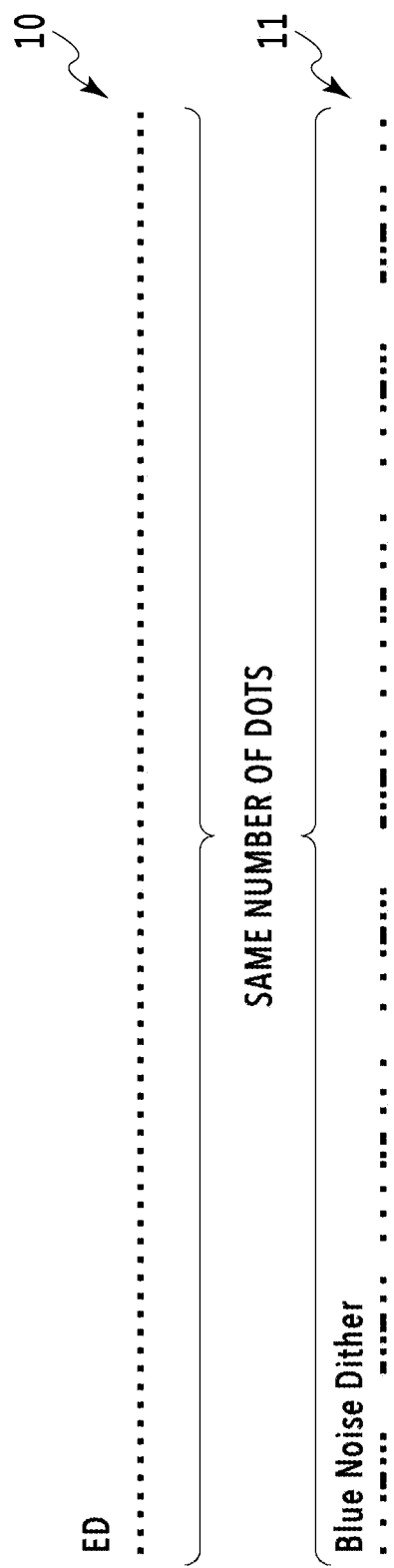
FIG. 1 is a diagram of comparison between an error diffusion method and a dither method in the case of printing a thin line.
Figure 2:
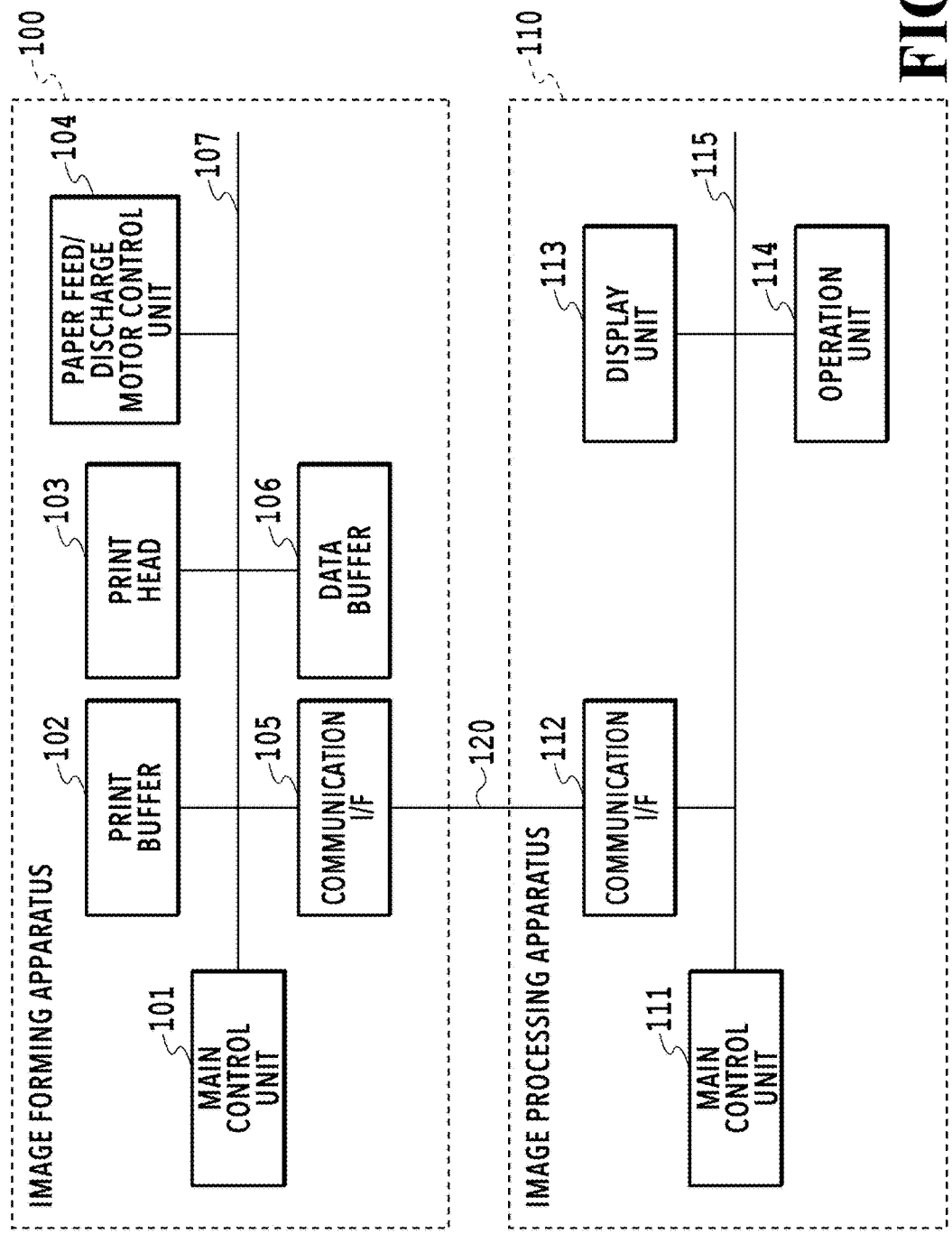
FIG. 2 is a diagram showing an example of a configuration of a printing system which can be used in the present invention.

FIG. 2 is a diagram showing an example of a configuration of a printing system which can be used in the present invention. A printing system in the present embodiment is composed of an image forming apparatus 100, which is an inkjet printing apparatus, and an image processing apparatus 110. The image forming apparatus 100 and the image processing apparatus 110 are connected via a signal line 120, and as the signal line 120, a printer cable in conformance with Centronics, for example, can be used.

The image forming apparatus 100 is composed of a main control unit 101, a print buffer 102, a print head 103, a paper feed/discharge motor control unit 104, a communication I/F 105, and a data buffer 106. The main control unit 101 includes a CPU (MPU), a ROM, and a RAM, and controls the entire image forming apparatus 100. The print buffer 102 stores image data before being transferred to the print head 103 as raster data.

The print head 103 is an inkjet print head having a plurality of printing elements that can eject ink droplets, and causes each of the printing elements to eject ink in accordance with image data stored in the print buffer 102. The paper feed/discharge motor control unit 104 controls conveying, feeding, and discharging a print medium such as paper. The communication I/F 105 is an interface for giving/receiving data signals to/from the image processing apparatus 110. The data buffer 106 is a buffer for temporarily storing image data received from the image processing apparatus 110. A system bus 107 is a bus to connect each of the units within the image forming apparatus 100.

Next, descriptions will be given on the image processing apparatus 110. A main control unit 111 includes a CPU (MPU), a ROM, and a RAM, and controls the entire image processing apparatus 110. A communication I/F 112 is an interface for giving/receiving data signals to/from the image forming apparatus 100. A display unit 113 is a CRT, for example, and displays various kinds of information to a user. An operation unit 114 includes a keyboard and a mouse, and these are used by the user to perform various operation. A system bus 115 is a bus that connects each of the units within the image processing apparatus 110.

Figure 3:
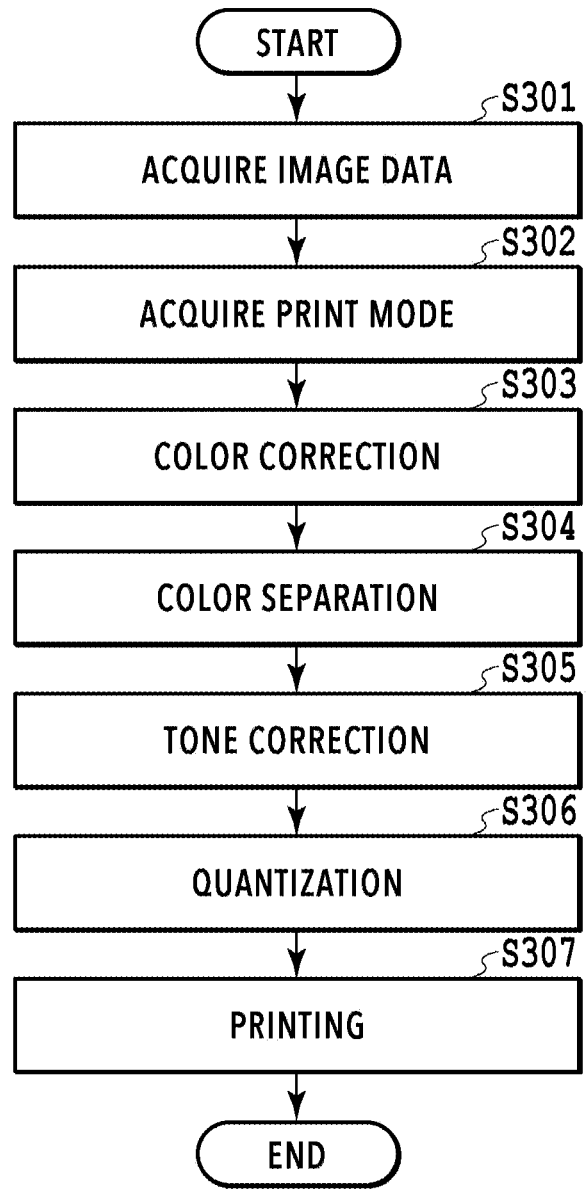
FIG. 3 is a flowchart for illustrating the steps of image processing.

FIG. 3 is a flowchart showing a rough flow starting from acquiring image data executed by the main control unit 111 of the image processing apparatus 110 or the main control unit 101 of the image forming apparatus until printing processing in the printing system of the present embodiment.

In Step 301, image data to be a target of printing processing is acquired. Image data specified by a user is loaded into memory via an application or the like. The image data in the present embodiment is retained in an 8-bit data format represented in R (red), G (green), and B (blue).

In Step 302, a printing mode specified by the user is acquired. The printing mode refers to a plurality of modes having different printing conditions. The details of the printing mode will be described later.

In Step 303, color correction is made. In the color correction, the acquired RGB image is corrected and then converted into image data of RGB (8-bit) which is a color space inherent to the image forming apparatus. The conversion is made by using, for example, a method of referring to a lookup table (LUT) stored in memory in advance.

In Step 304, color separation is made. In the color separation, RGB data after color correction conversion is separated into 8-bit image data represented in four colors, that is, C (cyan), M (magenta), Y (yellow), and K (black) used by the image forming apparatus 100. As a result, image data for four colors is generated. The color separation is also made, similar to color correction, by a method of using, for example, a lookup table (LUT) stored in memory in advance. It should be noted that, in the case where input image acquired in Step 301 is image data of CMYK, each of the above processing in Step 303 and Step 304 is skipped.

In Step 305, tone correction is made for CMYK image data. At the time of forming a dot of a color material on the surface of paper by way of application or implantation thereto, for example, color density generally increases along with the increased number of dots. However, the change in density, luminance, and chroma with respect to the number of dots and the amount of color materials is not constant. Accordingly, the tone correction is made such that the relation between a density value in CMYK image data after color separation and the density, luminance, and chroma on the surface of paper becomes substantially linear. This tone correction is made by using one-dimensional LUT, for example, for the density value for each of CMYK planes stored in memory in advance.

In Step 306, a halftone image is generated by performing quantization process on CMYK image data which has been tone corrected. As the details of quantization process will be described later, a quantization level may be a binary or a multi-value more than the binary. In the case where the quantization level is a multi-value, it is further developed into a binary by index development. The index development may be made by using a well-known technique such that, for instance, a dot arrangement according to a quantization level is stored beforehand in a form of a table to determine the dot arrangement (binary of print/non-print) based on the quantization level. As such, halftone image (binary image) data that can be printed by the print head is generated for every color.

In Step 307, printing processing is made by using binary image data acquired in quantization process. In the case of the inkjet printing apparatus of the present embodiment, ink is ejected to form a dot on the surface of paper in accordance with on-dot coordinates in an image which has been quantized. The above is a rough flow starting from acquiring image data until printing processing.

Incidentally, the process of each of the above steps (excluding Step 307) cannot be particularly defined to clearly divide up to which process is made by the image processing apparatus 110 and from which process is made by the image forming apparatus 100. For instance, in the case where up to quantization is made by the image processing apparatus 110, quantized data after performing quantization should be transferred to the image forming apparatus 100. Further, the main control unit 101 of the image forming apparatus 100 may perform index development by using index patterns stored in the data buffer 106 to control printing operation. Alternatively, depending on the performance of the image forming apparatus 100, all processes up to Step 307 can be made by the image forming apparatus 100 directly receiving the multi-valued RGB.

Further, the number of bits for image data to be handled by each step is not limited to 8 bit, but the number of bits at the time of output may be set higher than that at the time of input, for example, in order to maintain accuracy. In addition, the number of colors for the image forming apparatus is set to be four colors, or CMYK, but the colors may also include, for example, characteristic colors such as LC (light cyan) and LM (light magenta), and further, G (green) and Gy (grey). In this case, it is needless to say that processing is made by the number of planes for the number of colors.

(Quantization Process)

Figure 4:
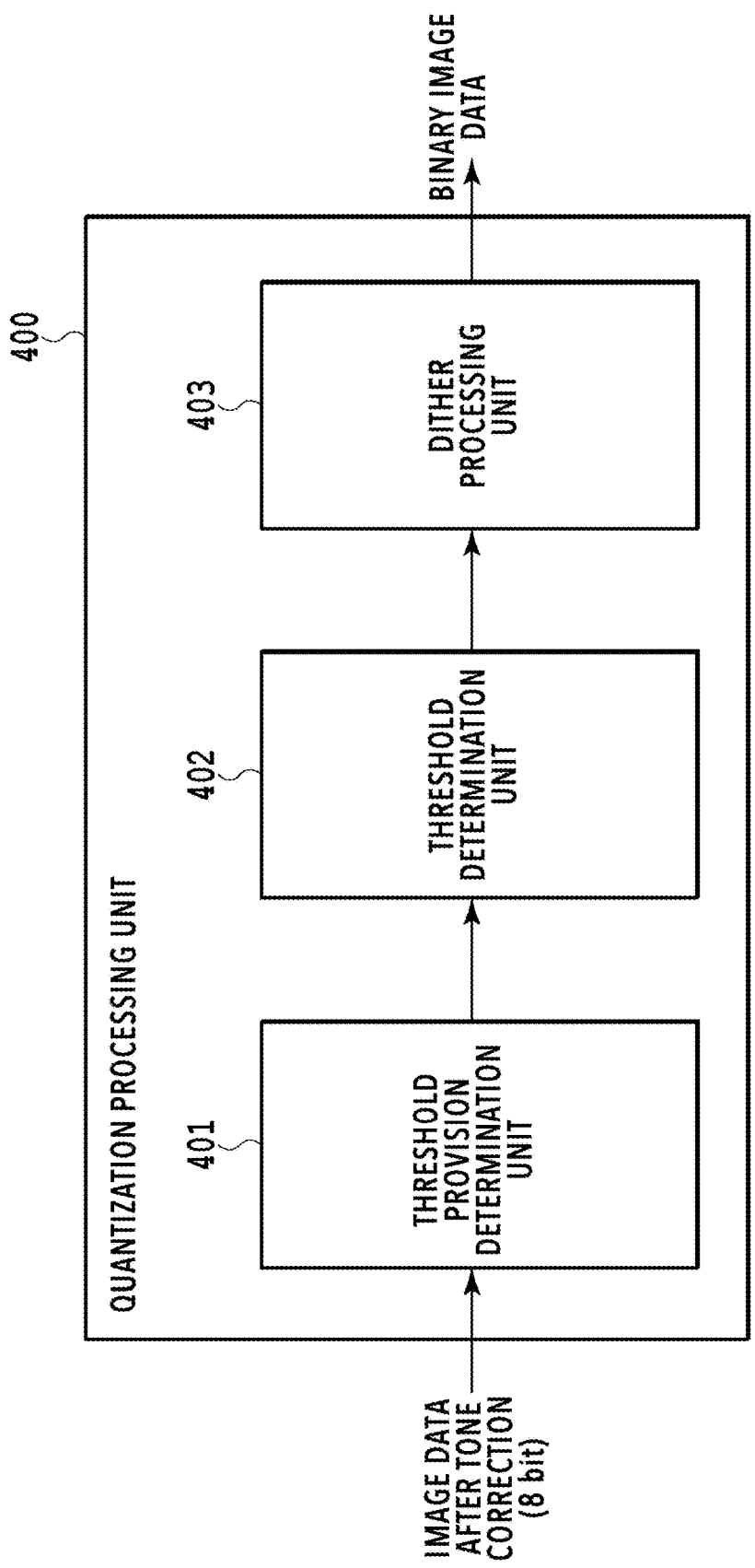
FIG. 4 is a block diagram showing a configuration in a quantization processing unit.
Figure 5:
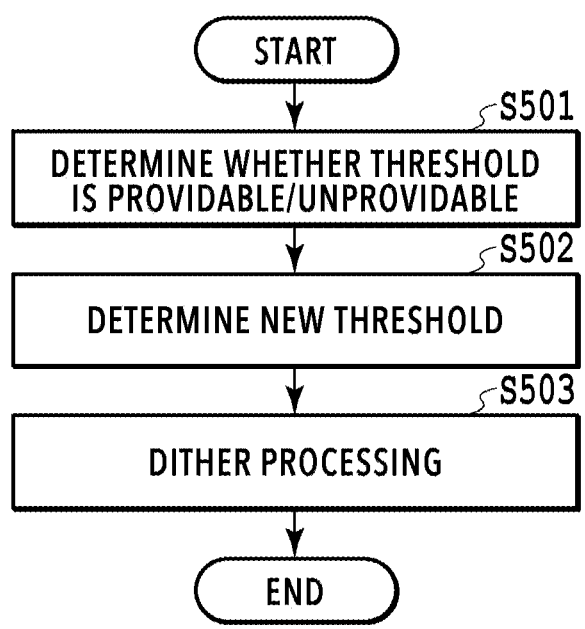
FIG. 5 is a flowchart showing a flow of quantization process.

Next, the quantization process in the above Step 306 will be described in detail by referring to FIG. 4 and FIG. 5. FIG. 4 is a block diagram showing a configuration in a quantization processing unit 400 as a function unit included in the image processing apparatus 110 (or the image forming apparatus 100). The quantization processing unit 400 is composed of a threshold provision determination unit 401, a threshold determination unit 402, and a dither processing unit 403. FIG. 5 is a flowchart showing the flow of the quantization process in the quantization processing unit 400. It should be noted that the series of processing is performed by reading a computer-executable program describing the following steps from the ROM or the like into the RAM and then by executing the program by the CPU.

In Step 501, the threshold provision determination unit 401 performs processing (hereinafter referred to as threshold provision allowance determination processing) to determine whether each pixel in image data (hereinafter referred to as an input image) that has been subjected to tone correction and inputted from a non-illustrated tone correction unit can provide a threshold value to another pixel. According to the present embodiment, each pixel of an input image is to have a density signal value of any of 0 to 255 for each pixel, and further, a white pixel (a pixel having a value of 0) is determined to be a pixel whose threshold value is providable, whereas a non-white pixel (a pixel having a value greater than 0) is determined to be a pixel whose threshold value is unprovidable.

Figure 6A:
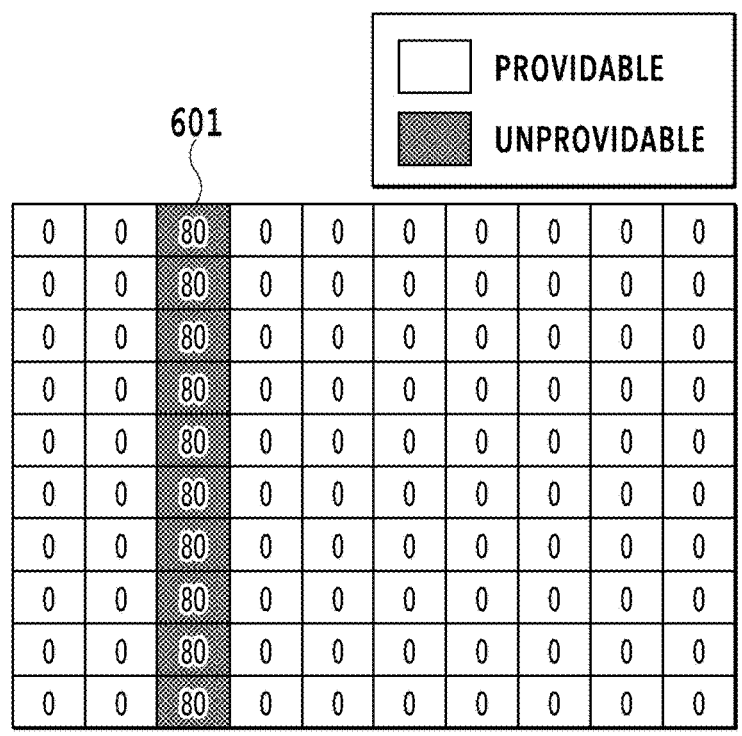
FIGS. 6A and 6B are diagrams showing an example of a result of threshold provision allowance determination processing.
Figure 6B:
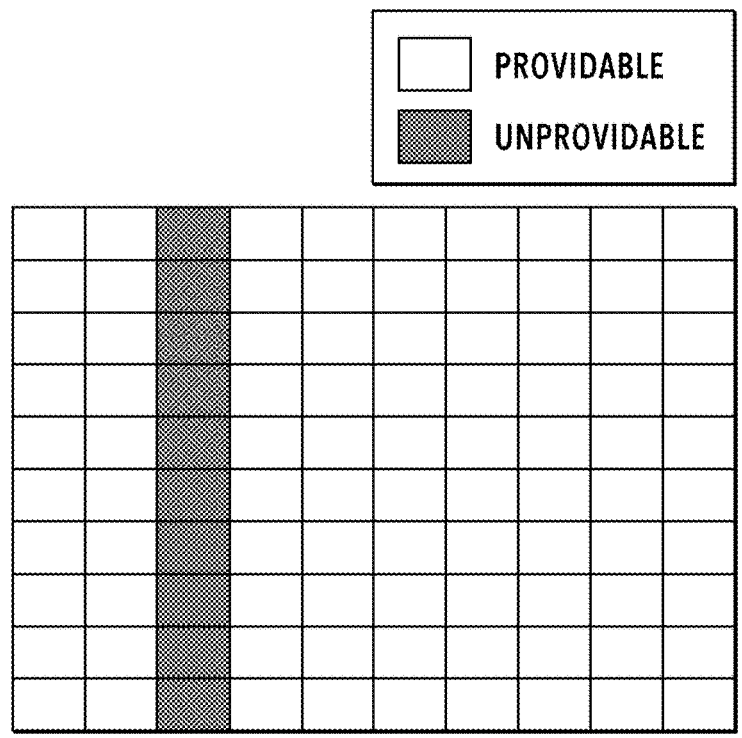

FIGS. 6A and 6B are diagrams showing an example of a result of threshold provision allowance determination processing according to the present embodiment. FIG. 6A shows a part of an image of a K plane among CMYK images after subjected to tone correction as an input image, and a thin line 601 having a width of one pixel which is composed of pixels having the density value of 80 extends in a longitudinal direction. FIG. 6B shows a result after determining whether a threshold value is providable or unprovidable for the input image of FIG. 6A, and each cell corresponds to the same position as each pixel of the input image. In FIG. 6B, a white cell represents a pixel whose threshold value is determined to be providable, whereas a grey cell represents a pixel whose threshold value is determined to be unprovidable.

Incidentally, in the present embodiment, a threshold value is set to be providable in the case where a pixel value is 0, but the threshold value may be set to be providable for a predetermined value or less. For instance, in a case where a minimum value of a threshold value in the threshold matrix is 10, setting the threshold value to be providable for a pixel whose pixel value is 10 or less can produce an effect substantially equivalent to that of the above case where a pixel value is 0. In any case, it is preferable that a threshold value corresponding to a pixel which can be determined to have extremely low probability of printing a dot be determined to be providable.

Such threshold provision allowance determination is to be made in a manner of, for example, making processing starting from a pixel at an upper left corner of the input image to subsequent pixels rightward in order, and, after reaching the end of the row, moves on to a row directly under the row to make processing from a left end to a right end so as to make determination for the entire pixels within the input image. In this case, for example, a unit or an order to be processed such as for every specific band or every specific area may be appropriately set. In the present embodiment, for simplifying explanations, a description regarding the color planes of CMY will be omitted.

Going back to the flowchart of FIG. 5, in Step 502, the threshold determination unit 402 uses an initial threshold matrix which has been set beforehand to make processing to determine a new threshold value (new-threshold determination processing) for every specified processing area based on the result of the threshold provision allowance determination processing in Step 501.

Figure 7:
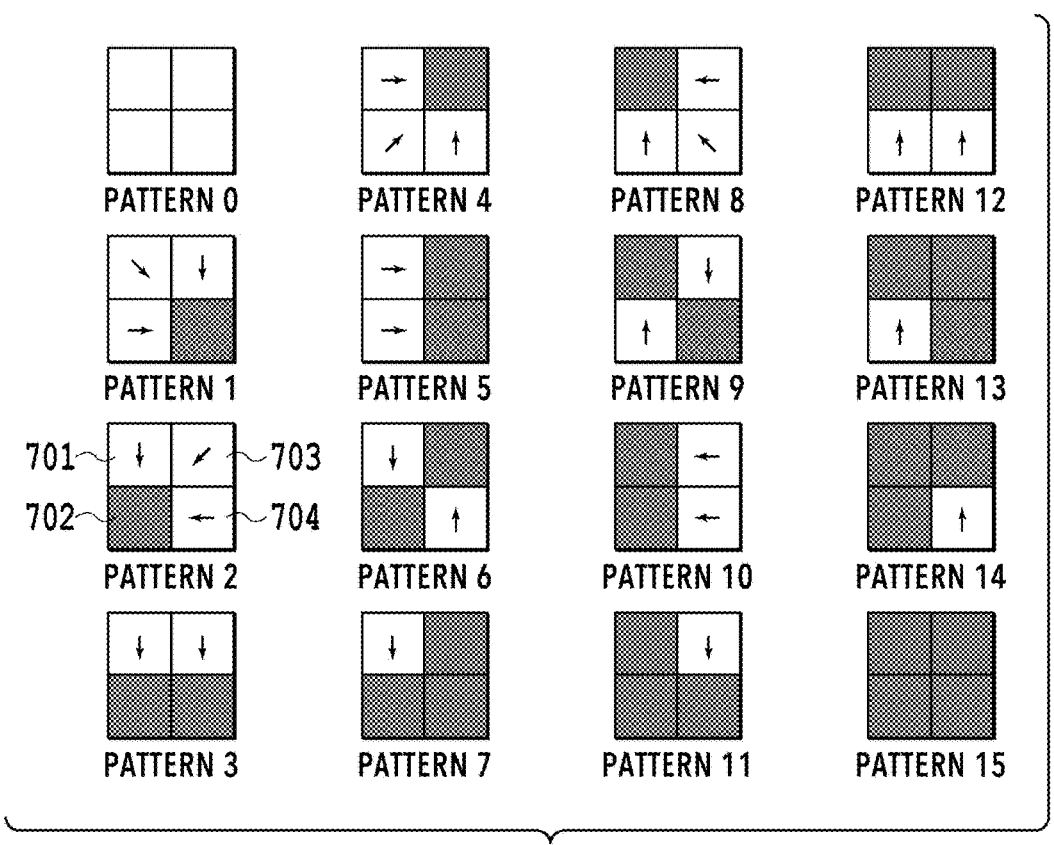
FIG. 7 is a diagram showing an example of patterns to be referred to at the time of performing new-threshold determination processing.

FIG. 7 is a diagram showing an example of patterns to be referred to at the time of performing new-threshold determination processing. In this example, a specific processing area is set to be a rectangular area of 2×2 pixels, 16 reference patterns from patterns 0 to 15 exist. A white cell in each pattern represents a pixel whose threshold value is determined to be providable, whereas a grey cell represents a pixel whose threshold value is determined to be unprovidable. With respect to the processing area of 2×2 pixels included in the input image, the threshold determination unit 402 correlates one pattern out of 16 patterns based on a determination result of the threshold provision determination unit 401. For instance, in the case where processing area of 2×2 pixels in the upper left of the diagram of FIG. 6A, pattern 0 is correlated. In the case where the next right 2×2 pixels is a processing area, pattern 10 is correlated.

Arrows in each pattern indicate directions to provide a threshold value. For instance, in the case of pattern 2, an upper left pixel 701 has an arrow pointing downward. This means that if a threshold value of the upper left pixel 701 is smaller than a threshold value of a lower left pixel 702 (a pixel of interest) indicated in grey, the threshold value of the upper left pixel 701 is providable as a new threshold value of the lower left pixel 702 (the upper left pixel 701 is a reference pixel for the lower left pixel 702). In the case of the pattern 2, threshold values of an upper right pixel 703 and a lower right pixel 704 are also providable for the lower left pixel 702, and if there are a plurality of candidates as in this case, a smallest one of the threshold values is set as a new threshold value for the pixel of interest. However, if the threshold value of the pixel of interest is smaller than the smallest threshold value, no change is made therefor. Due to such processing, the probability of printing (1) a dot before changing a threshold value becomes higher in a pixel of a destination to be provided.

Incidentally, among all the 16 patterns shown in FIG. 7, pattern 0 and pattern 15 do not have any arrow. The pattern 15 indicates the case where all four pixels have pixel values greater than 0, and do not have a pixel whose threshold value is providable within the 2×2 pixel processing area. Accordingly, the reference to a threshold value and the change to a new threshold value are not made in the pattern 15. Meanwhile, the pattern 0 indicates the case where all four pixels have a pixel value of 0, and does not have a pixel to which a threshold value is provided within the 2×2 pixel processing area. Accordingly, the reference to a threshold value and the change to a new threshold value are not made in the pattern 0. It should be noted that the patterns shown in FIG. 7 are a mere example, and the directions of arrows and the number of arrows are not limited to this.

FIGS. 8A to 8C are diagrams showing a state in which new threshold values are determined in threshold matrixes in accordance with the reference patterns shown in FIG. 7 based on a result of threshold provision allowance determination shown in FIG. 6B. FIG. 8A shows an initial threshold matrix which has been prepared beforehand. Hereinafter, such a threshold matrix is referred to as a fiducial threshold matrix. Meanwhile, FIG. 8B shows a first threshold matrix which can be obtained in the case of performing first new-threshold determination processing in the quantization process in Step 306. Further, FIG. 8C shows a second threshold matrix which can be obtained in the case of performing second new-threshold determination processing in the quantization process in Step 306. In the present embodiment, in the case where the first printing mode is acquired in Step 302 in FIG. 3, the quantization processing unit 400 performs the first new-threshold determination processing, and in the case where the second printing mode is set, the quantization processing unit 400 performs the second new-threshold determination processing.

In the fiducial threshold matrix shown in FIG. 8A, an area 801 surrounded by a bold line is a rectangular area of 2×2 pixels, which is a unit of processing. In the case where image data shown in FIG. 6A is inputted, a result of threshold provision allowance determination which is made in Step 501 becomes in a state as shown in FIG. 6B. Specifically, in the area 801, it is determined that two pixels on the left side corresponding to a thin line area cannot provide a threshold value and two pixels on the right side can provide a threshold value. As a result, the area 801 corresponds to the pattern 10 in FIG. 7. In other words, in the area 801, in the case where the upper left pixel is a pixel of interest, the upper right pixel becomes a reference pixel, and in the case where the lower left pixel is a pixel of interest, the lower right pixel becomes a reference pixel. As a result, since the threshold value of 248 in the upper left pixel is greater than the threshold value of 79 in the upper right pixel, a threshold value of the upper left pixel is changed from 248 to 79. Meanwhile, the threshold value of 134 in the lower left pixel is smaller than the threshold value of 189 in the lower right pixel, a threshold value of the lower left pixel is not changed. In Step 502, such processing is repeated for every specific processing area (here, the rectangular area of 2×2 pixels) to obtain a threshold matrix shown in FIG. 8B. In FIG. 8B, focusing on threshold values in a third column corresponding to a thin line portion, it can be recognized that the threshold values are partially changed in accordance with the pattern 10 as follows:
Before change: 55, 12, 248, 134, 84, 164, 98, 23, 133, and 228
After change: 55, 12, 79, 134, 7, 164, 98, 23, 106, and 0
The new threshold matrix shown in FIG. 8B as generated in the above manner is referred to as a first threshold matrix in the present embodiment.

Meanwhile, FIG. 8C is a diagram showing a result of the threshold change described above based on a modified threshold value obtained by multiplying an initial threshold value of a threshold-providing pixel by a coefficient 1.5 among pixels whose threshold values are determined to be providable. Focusing on the area 801 of the fiducial threshold matrix shown in FIG. 8A, the threshold value of 248 in the upper left pixel is greater than a modified threshold value in the upper right pixel, which is 119 (=79×1.5), and therefore, a threshold value in the upper left pixel is changed from 248 to 119. Meanwhile, since the threshold value of 134 in the lower left pixel is smaller than a modified threshold value in the lower right pixel, which is 284 (=189×1.5), the threshold value of the lower left pixel is not changed. As a result of repeating such processing for every specific processing area (here, the rectangular area of 2×2 pixels), a threshold matrix shown in FIG. 8C is obtained. In FIG. 8C, focusing on threshold values in a third column corresponding to a thin line portion, it can be recognized that the threshold values are partially changed in accordance with the pattern 10 as follows:
Before change: 55, 12, 248, 134, 84, 164, 98, 23, 133, and 228
After change: 55, 12, 119, 134, 11, 164, 98, 23, 133, and 0
A new threshold matrix generated as above is referred to as a second threshold matrix in the present embodiment. A difference between the first threshold matrix and the second threshold matrix will be described later in detail.

Going back to the descriptions for the flowchart of FIG. 5, in Step 503, the dither processing unit 403 uses the first threshold matrix or the second threshold matrix in which new threshold values determined by the threshold determination unit 402 are reflected to perform halftone processing by using the dither method. Then, this processing is finished.

For explaining the difference between the first threshold matrix and the second threshold matrix, FIGS. 8A to 8C are again referred to. In the case of the present example, in the first threshold matrix shown in FIG. 8B, threshold values of four pixels included in the thin line area are changed to smaller values with respect to the fiducial threshold matrix shown in FIG. 8A. Meanwhile, in the second threshold matrix shown in FIG. 8C, threshold values of three pixels included in the thin line area are changed to smaller values with respect to the fiducial threshold matrix shown in FIG. 8A. Further, focusing on the same pixel positions whose threshold values are changed, threshold values after the change are smaller in the first threshold matrix than in the second threshold matrix. In other words, the probability of printing a dot is higher in dither processing using the first threshold matrix rather than in dither processing using the second threshold matrix.

Figure 9:
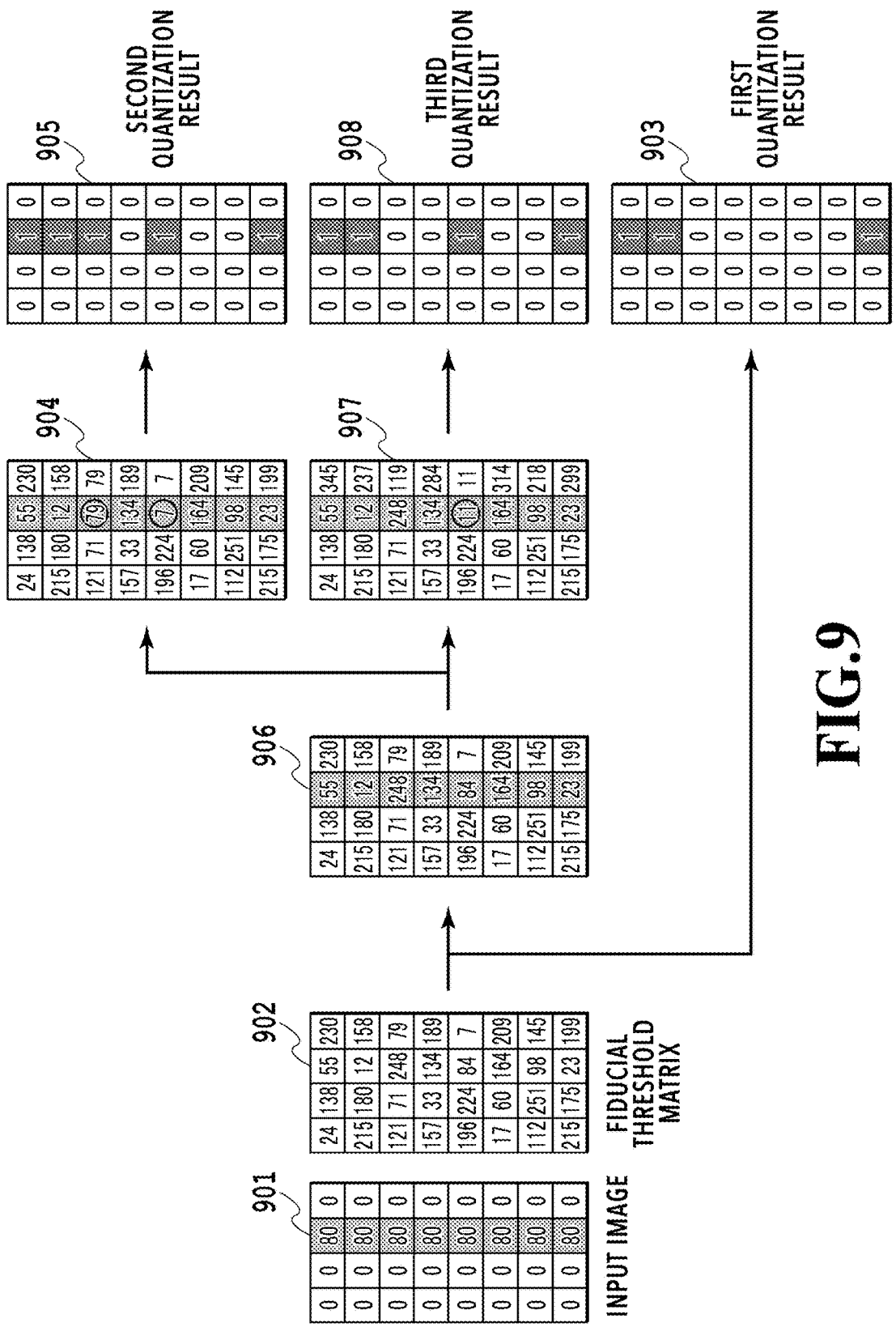
FIG. 9 is a diagram for comparing a state of quantization in the case where threshold matrixes are different.

FIG. 9 is a diagram for comparing the states of quantization in the case where each of the fiducial threshold matrix, first threshold matrix, and second threshold matrix are used. Here, the case where an input image 901 in which pixels of the signal values of 80 are aligned among pixels of the signal values of 0 is quantized by using the fiducial threshold matrix 902.

In the case of making quantization by typical dither processing without any special processing, the result of quantization is as shown in a first quantization result 903. Specifically, among the input image 901, a pixel having a signal value greater than a threshold value in the fiducial threshold matrix 902 is to be printed (1), whereas a pixel having a signal value equal to or less than a threshold value in the fiducial threshold matrix 902 is not to be printed (0). According to the first quantization result 903, among a thin line area having one-pixel width (the entire eight pixels in a second column from the right), three pixels are to be printed (1), and thus three dots are to be printed.

Meanwhile, in the case of performing new-threshold determination processing, the threshold provision determination unit 401 determines, for each pixel in the fiducial threshold matrix 902, whether whose threshold is providable or unprovidable and then, an after-determination threshold matrix 906 is obtained. In the after-determination threshold matrix 906, areas corresponding to the thin line area of the input image 901 are determined to be a pixel whose threshold is unprovidable (grey) and other areas are determined to be a pixel whose threshold is providable (white).

Then, the threshold determination unit 402 determines new threshold values by correlating a corresponding pattern among the patterns shown in FIG. 7 based on the individual processing areas (2×2 pixels) in the after-determination threshold matrix 906. In the case of the present example, the pattern 10 is correlated among the 16 patterns shown in FIG. 7. Further, the threshold determination unit 402 performs either the first new-threshold determination processing or the second new-threshold determination processing based on a printing mode set in Step 302.

In the case of performing the first new-threshold determination processing, the threshold determination unit 402 changes threshold values of pixels corresponding to the thin line area by directly using threshold values retained by the after-determination threshold matrix 906. Specifically, the threshold values of pixels indicated in grey are compared with the threshold values of pixels adjacent on the right in accordance with the pattern 10, and only if a threshold value in grey is greater than a threshold value of an adjacent pixel, such a threshold value is changed to the threshold value of the adjacent pixel. As a result, a first threshold matrix 904 is obtained.

In the first threshold matrix 904, threshold values changed from those in the fiducial threshold matrix 902 are indicated with circles. Then, the result of quantizing the input image 901 using the first threshold matrix 904 is shown as a second quantization result 905. According to the second quantization result 905, among the thin line area having one-pixel width (the entire eight pixels in the second column from the right), five pixels are to be printed (1), and thus five dots are to be printed. In other words, the number of dots to be printed is greater, by two, than the first quantization result 903 for which threshold values of the fiducial threshold matrix 902 are directly used.

In the case of performing the second new-threshold determination processing, the threshold determination unit 402 multiplies reference threshold values (the threshold values in a first column from the right) retained by the after-determination threshold matrix 906 by a coefficient 1.5. Then, the result is used to change threshold values of pixels corresponding to the thin line area (the second column from the right). Specifically, in the after-determination threshold matrix 906, threshold values of the pixels indicated in grey are compared with modified threshold values obtained by multiplying the threshold values of pixels adjacent on the right by 1.5 in accordance with the pattern 10, and only if a threshold value in grey is greater than the modified threshold value, such a threshold value is changed to the modified threshold value of the adjacent pixel. As a result, a second threshold matrix 907 is obtained.

In the second threshold matrix 907, a threshold value changed from that in the fiducial threshold matrix 902 is indicated with a circle. Then, the result of quantizing the input image 901 using the second threshold matrix 907 is shown as a third quantization result 908. Among the thin line area having one-pixel width (the entire eight pixels in the second column from the right), four pixels are to be printed (1), and thus four dots are to be printed. In other words, the number of dots to be printed is greater, by one, than the first quantization result 903 for which threshold values of the fiducial threshold matrix 902 are directly used, but is smaller, by one, than the second quantization result 905 in the case of performing the first new-threshold determination processing.

In the case of comparing the first quantization result 903, the second quantization result 905, and the third quantization result 908, break on a thin line is suppressed in the second quantization result 905 and the third quantization result 908 compared to those in the first quantization result 903 for the number of dots that have been added. However, the degrees of such addition between the second quantization result 905 and the third quantization result 908 are different from each other.

According to the present embodiment, in a case where break on a thin line is found after making quantization using the fiducial threshold matrix, the new-threshold determination processing is used to suppress such a state. In this case, first threshold processing and second threshold processing are prepared, and if the density of a thin line is too high with the first new-threshold determination processing, the second new-threshold determination processing is employed. Specifically, in order to balance out between the break on a thin line and reproducibility of density information, any one of the quantization process using the fiducial threshold matrix, the first new-threshold setting processing, and the second new-threshold setting processing is to be selected. To be more specific, in the case where a printing mode has a relatively lower density for individual dots, the first new-threshold determination processing is performed so as to prioritize suppressing break on a thin line. Meanwhile, in the case where a printing mode has a relatively higher density for individual dots, the quantization process is performed using the fiducial threshold matrix. Further, in the case where a printing mode has a relatively lower density for individual dots but the density is too high with the first new-threshold setting processing, the second new-threshold determination processing is to be performed.

Incidentally, the first threshold matrix 904 and the second threshold matrix 907 are described as completed threshold matrixes in the diagram for the convenience of explanation, but such threshold matrixes are not actually prepared. A threshold value in the fiducial threshold matrix corresponding to a pixel of interest is temporarily changed to a new threshold value during quantization, but once the pixel is out of the target of processing, the threshold value also returns to the original threshold value in the fiducial threshold matrix.

Figure 14A:
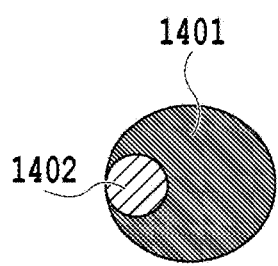
FIGS. 14A to 14C are diagrams showing the relation between the state of dot landing and density.
Figure 14B:
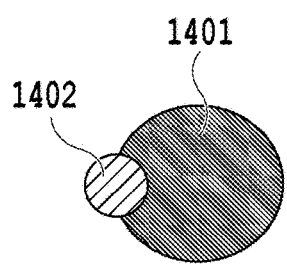
Figure 14C:
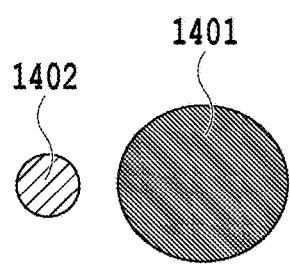

FIGS. 14A to 14C are diagrams showing the relation between the state of dot landing and density in which one dot is represented on a print medium. In the case of an inkjet printing apparatus, there is a case where a small sub-droplet is ejected together with a main droplet along with one ejecting operation. Such a sub-droplet is ejected later than the ejection of a main droplet, and further has lower ejection speed than that of the main droplet. Accordingly, in the inkjet printing apparatus which prints an image while relatively moving a print head and a print medium, a main droplet and a sub-droplet are displaced in a forwarding direction of the print head with respect to the print medium for the landing.

In such a state, if time required from the landing of the main droplet on a print medium to the landing of the sub-droplet thereon is extremely short, as shown in FIG. 14A, the landing area of a sub-droplet 1402 is included in the landing area of a main droplet 1401, thereby area that is covered by the droplets is small and relative lower density is represented. If time required from the landing of the main droplet on a print medium to the landing of the sub-droplet thereon is longer, as shown in FIG. 14B and FIG. 14C, the landing position of the sub-droplet 1402 is apart from the main droplet 1401, thereby area that is covered by the droplets is larger and higher density is represented. Further, the larger the distance between an ejection port face of the print head and a print medium (hereinafter referred to as a paper distance) is, for example, the longer the time required from the landing of a main droplet to the landing of a sub-droplet becomes, and therefore, the displacement of landing positions between the main droplet and sub-droplet becomes larger.

Figure 15:
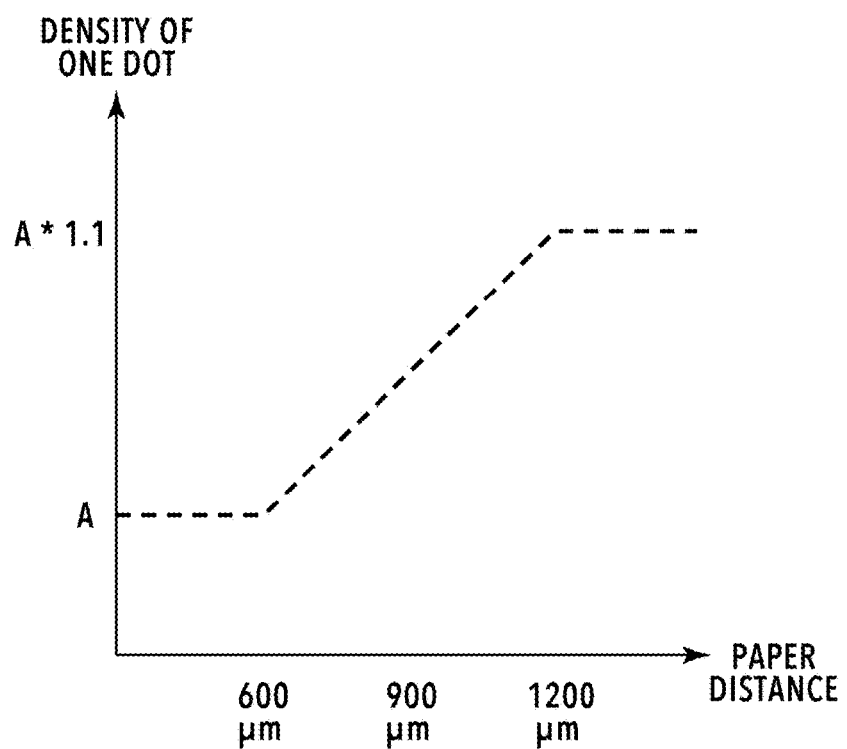
FIG. 15 is a graph showing the relation between a paper distance and density.

FIG. 15 is a graph showing the relation between the paper distance and the density represented by one dot. In the graph, the case of a paper distance being 600 μm is shown in FIG. 14A, the case of a paper distance being 900 μm is shown in FIG. 14B, and the case of a paper distance being 1200 μm is shown in FIG. 14C. Here, while the case of the paper distance of 600 μm has density A, the density in the case of the paper distance of 1200 μm is 1.1 times higher than A. As such, the longer the paper distance is, the larger an area in which one dot covers a print medium becomes and the higher the density to be represented becomes.

In view of the above, according to the present embodiment, in the case of using a print medium that is unlikely to cause cockling, for example, a user sets the first printing mode which has a short paper distance. As a result, the first new-threshold determination processing is performed, and a number of relatively smaller dots are printed in a thin line area. However, in a case where the density of a thin line is too high at the time of adopting the first new-threshold determination processing, the second printing mode can also be set. In either of the cases, break on a thin line can be sufficiently suppressed compared to the case of not performing the new-threshold determination processing. Meanwhile, in the case of using a print medium that is likely to cause cockling, the user sets a printing mode that does not perform the new-threshold determination processing. As a result, the quantization process based on fiducial threshold values is performed, the small number of relatively larger dots are printed in a thin line area.

Figure 16A:
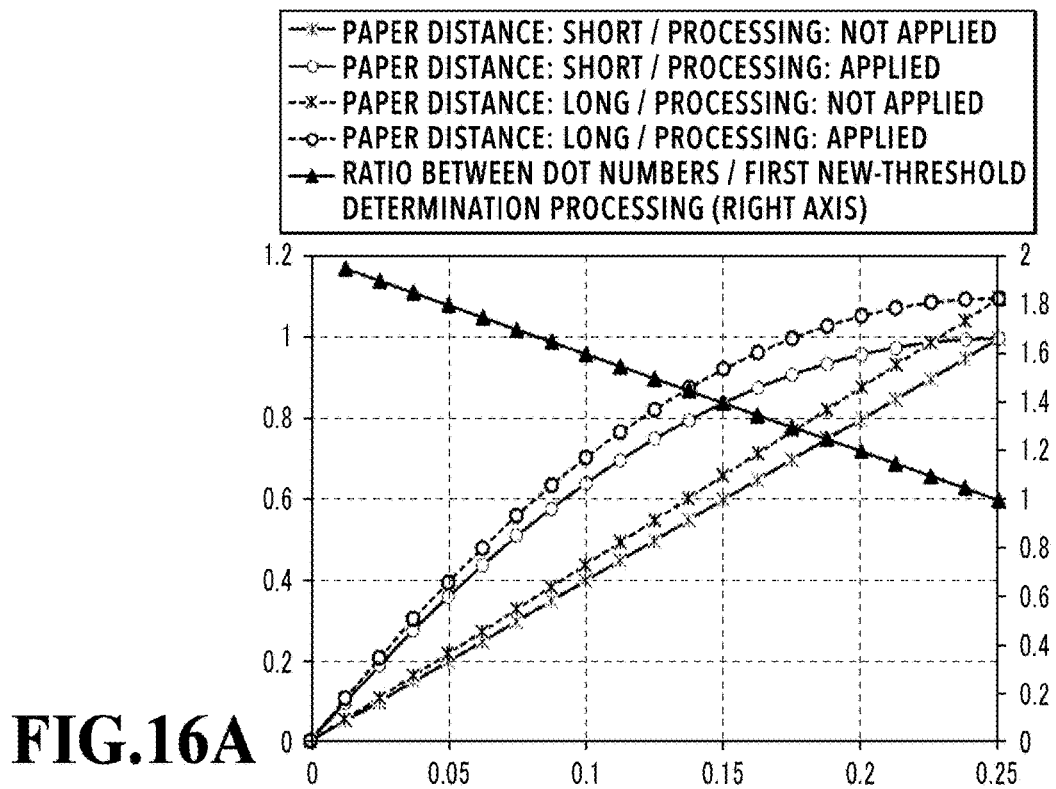
FIGS. 16A and 16B are graphs illustrating an effect of new-threshold setting processing.
Figure 16B:
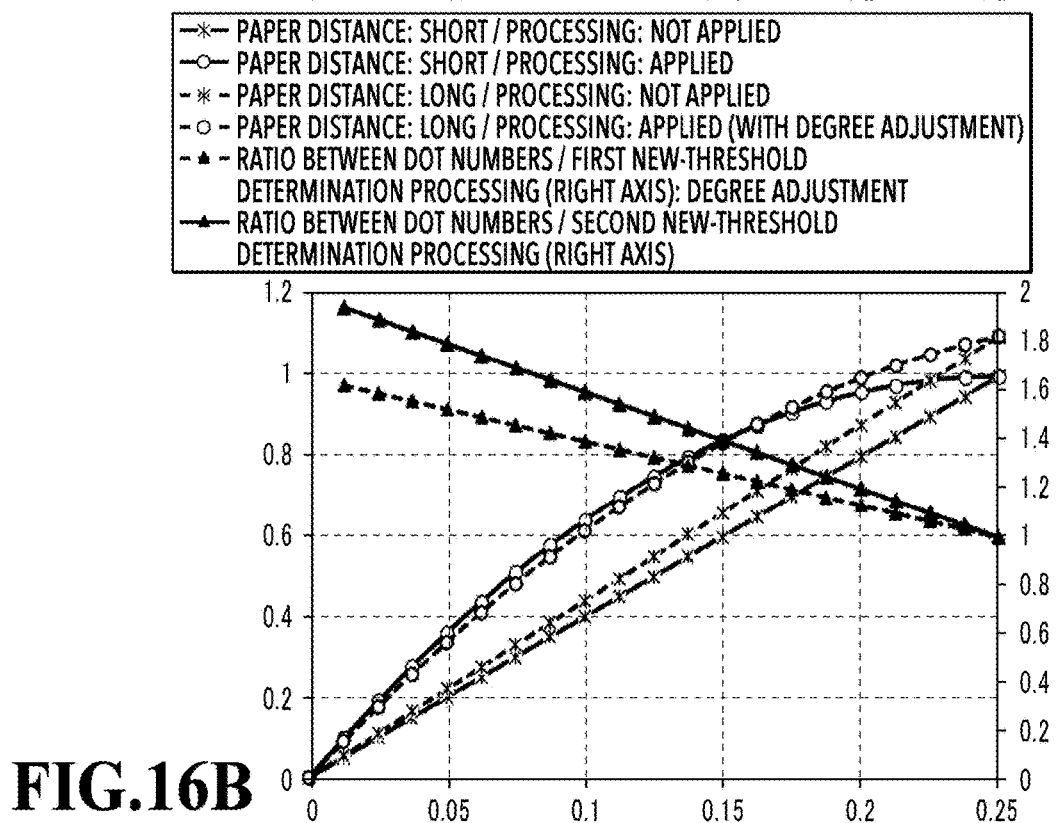

FIGS. 16A and 16B are graphs each illustrating the rise of density in the case of adopting the new-threshold setting processing against the case of not adopting the new-threshold setting processing by comparing between the case of the long paper distance (1200 μm) and the case of the short paper distance (600 μm). Both graphs indicate the printing density of dot (tone) in a horizontal axis, in which a state (0.25) of printing one dot in a processing area (the rectangular area of 2×2 pixels) is presented as a maximum value. On the other hand, a vertical axis on the left side indicates measured optical density in the case of printing dots with individual printing density. Further, a vertical axis on the right side indicates a ratio of the number of dots in the case of performing the new-threshold setting processing to the number of dots in the case of not performing the processing (hereinafter referred to as the ratio between the number of dots). The ratio between the number of dots is larger in the case where printing density is low, which means that if the lightness of a thin line is high (that is, the density value is smaller), the impact of the new-threshold determination processing is large. Moreover, no change occurs in threshold values even in performing new-threshold processing at the printing density of dot being 0.25, and the ratio between the number of dots stays in 1.0.

FIG. 16A shows a comparison between the case of performing the first new-threshold setting processing and the case of not performing the new-threshold determination processing for the cases of the long and short paper distances. In the case of not performing the new-threshold determination processing, the density for the long paper distance (1200 μm) is 1.1 times higher than the density for the short paper distance (600 μm) due to satellite influence. Moreover, regardless of the paper distance being long or short, the number of dots are increased upon performing the first new-threshold setting processing, but the density difference arises between those cases.

Meanwhile, FIG. 16B shows a comparison between each case of performing the first new-threshold determination processing for the short paper distance and the second new-threshold determination processing for the long paper distance and the case of not performing the new-threshold determination processing. In the case of the present example, the density obtained in the case of long paper distance and short paper distance is substantially the same. This is because that, by performing the second new-threshold determination processing, the number of dots is decreased compared to the case of performing the first new-threshold determination processing in FIG. 16A. In other words, a thin line having the density signal value of the same level can be printed in substantially equivalent density either with long or short paper distance.

According to the present embodiment, the density of a thin line is approximated by applying and not applying the new-threshold determination processing and by reducing density while applying the new-threshold determination processing, but the density corresponding to individual paper distances may further be adjusted by using a coefficient by which the fiducial threshold value is multiplied. For example, if a coefficient is further set to be a value greater than 1.5, a probability that a threshold value in a providing pixel is smaller than a threshold value in a to-be-provided pixel will decrease and the frequency of threshold changes is reduced, whereby the density of a thin line is further reduced. On the contrary, if a coefficient is set to be less than 1, a probability that a threshold value in a providing pixel is smaller than a threshold value in a to-be-provided pixel will increase and the frequency of threshold changes is increased, whereby the density of a thin line is further increased compared to the case of performing the first new-threshold determination processing.

For instance, in a case where break on a thin line still remains to be a problem even by performing the first new-threshold determination processing in a short paper distance, the density of a thin line can be raised by further printing multiple dots by performing the second new-threshold determination processing with a coefficient of less than 1. Specifically, according to the present embodiment, by preparing a plurality of coefficients including 1, the density of a thin line can be adjusted while suppressing break thereon among various printing conditions.

Incidentally, in the above example, a coefficient used in the second new-threshold determination processing is adjusted to 1.5 so as to bring density values at a point where a printing density is 0.15 in the cases of the long and short distances from paper match with each other at about 0.8. This is because the value of the printing density being 0.15 corresponds to a tone frequently used in a color palette for an application for creating CAD drawings. However, the present embodiment is not limited to such a form. In any case, it can be said to be preferable that adjustment be made so as to bring density values match with each other at the most frequently used printing density.

By the way, a difference of the density per dot as described in FIGS. 14A to 14C depends on the scanning speed of the print head. This is because that if the scanning speed of the print head is higher, each of the speed components of a main droplet and a sub-droplet in a scanning direction of a carriage is increased, thereby inducing increased displacement of their landing positions.

FIG. 17 is a table showing an example of multiple printing modes that can be adapted in the present embodiment. Printing modes A to E includes settings of paper distances and scanning speeds of the print head, in which at least either one of them are different among the printing modes. According to the present embodiment, an appropriate coefficient is to be prepared for each of such printing modes so that a desirable density of a thin line can be printed without any break irrespective of any printing mode being set.

Second Embodiment

Similar to the first embodiment, the present embodiment also uses the printing system shown in FIG. 2 to perform image processing in accordance with the flowchart of FIG. 3. In quantization process of the present embodiment, in addition to the first new-threshold determination processing described in the first embodiment, specific third new-threshold determination processing is also prepared in the present embodiment. Further, in the quantization process in Step 306, quantization process based on either one of the first new-threshold determination processing or the third new-threshold determination processing is performed in accordance with a printing mode acquired in Step 302. The third new-threshold determination processing is processing for increasing the density of a thin line by printing further more dots than those in the case of the first new-threshold determination processing, and, as in the first new-threshold processing, is performed by the threshold provision determination unit 401, the threshold determination unit 402, and the dither processing unit 403 shown in FIG. 4. The third new-threshold determination processing will be described below in detail.

Figure 10:
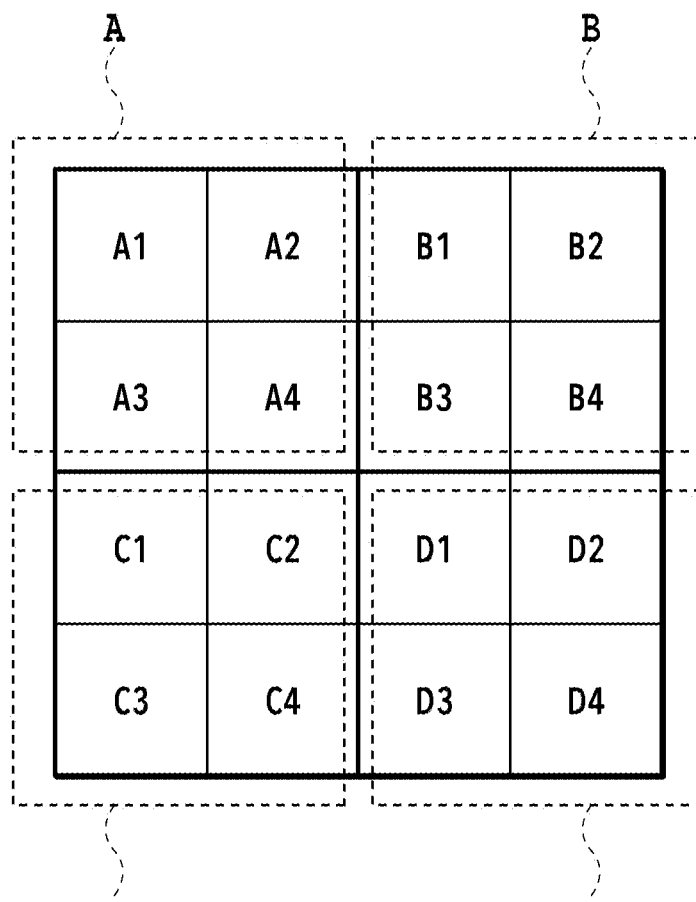
FIG. 10 is a diagram for illustrating processing areas to be used for a third new-threshold determination processing.

FIG. 10 is a diagram for illustrating processing areas to be used for the third new-threshold determination processing. In the third new-threshold determination processing, new-threshold tentative determination processing is performed on a processing area composed of a 4×4 pixel area before performing the new-threshold determination processing on the area of 2×2 pixels such as the first new-threshold determination processing. In the diagram, for the sake of convenience, 2×2 pixels in the upper left of the 4×4 pixel area is denoted as an area A, 2×2 pixels in the upper right as an area B, 2×2 pixels in the lower left as an area C, and 2×2 pixels in the lower right as an area D. Similarly, with respect to each of the areas A to D, a pixel in the upper left of each area is denoted as 1, a pixel in the upper right as 2, a pixel in the lower left as 3, and a pixel in the lower right as 4; and thus, for example, a pixel in the upper left of the area A is called A1.

Figure 11:
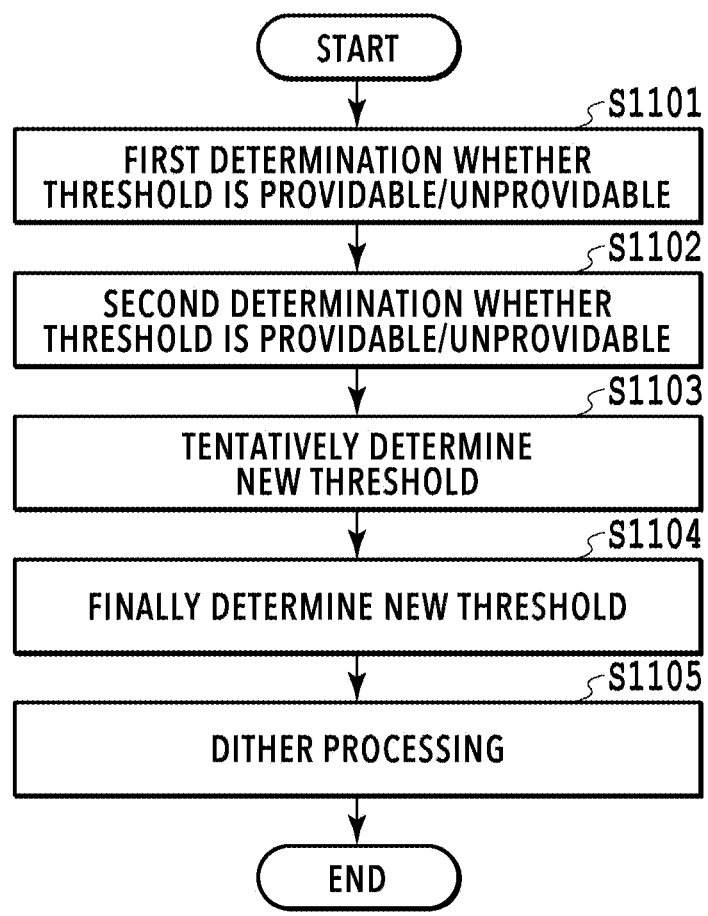
FIG. 11 is a flowchart for illustrating the third new-threshold determination processing.
Figure 12:
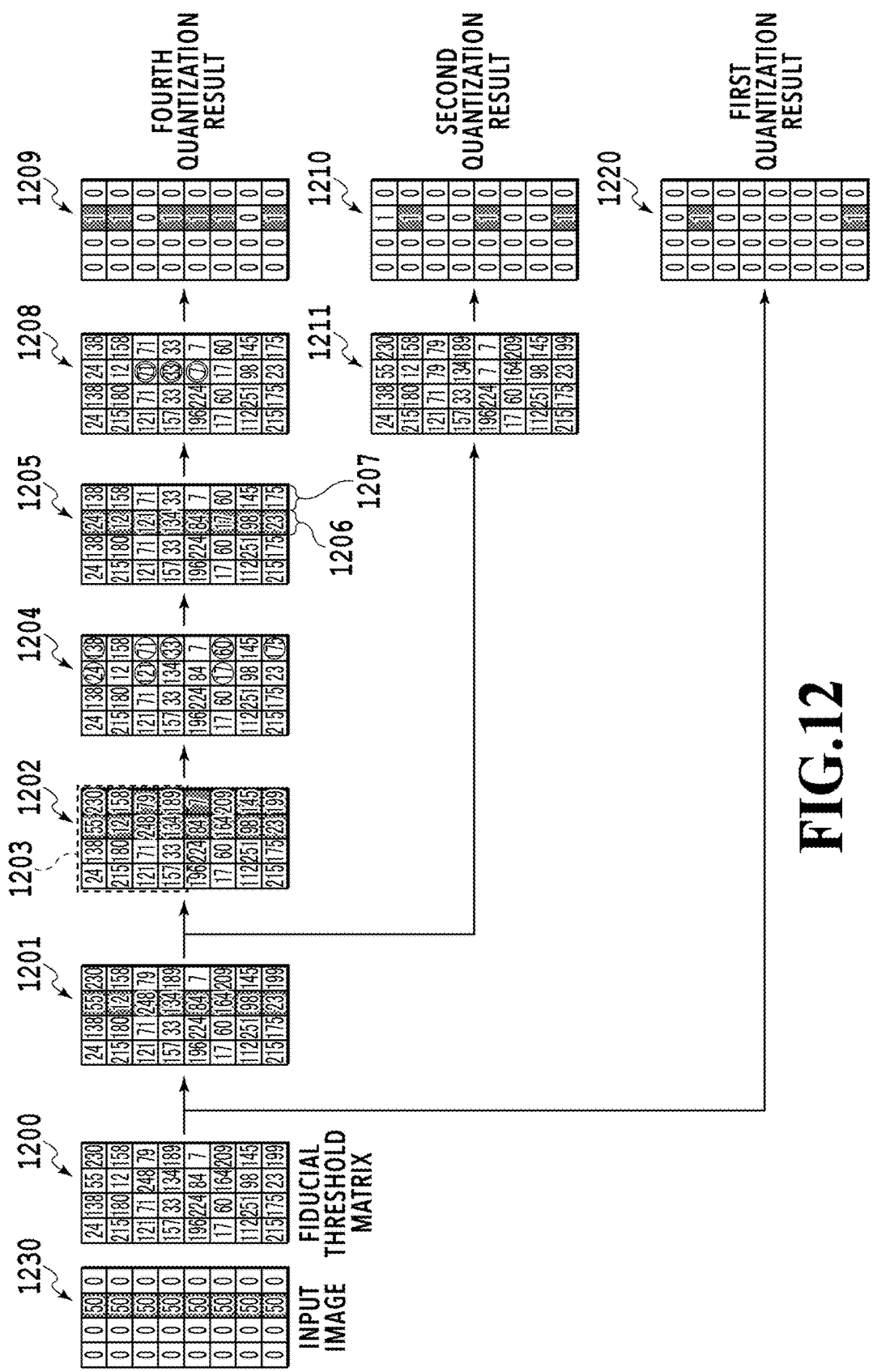
FIG. 12 is a diagram showing the lapse of quantization in the third new-threshold determination processing.

FIG. 11 is a flowchart for illustrating the third new-threshold determination processing performed by the quantization processing unit 400. In addition, FIG. 12 is a diagram showing the progress of quantization in the third new-threshold determination processing. Descriptions on the steps of the third new-threshold determination processing will be given below by following the flowchart of FIG. 11 with reference to FIG. 12.

In Step 1101, the threshold provision determination unit 401 makes a first determination. To be more specific, a tone-corrected input image 1230 inputted from the non-illustrated tone correction unit is scrutinized to distinguish between pixels whose thresholds are providable and unprovidable, thereby obtaining a first after-determination threshold matrix 1201. In FIG. 12, the first after-determination threshold matrix 1201 is a matrix that reflects the result of first determination processing in the input image 1230 on the fiducial threshold matrix 1200. As in FIG. 6B, a white cell indicates that a pixel whose threshold value is determined to be providable, whereas a grey cell indicates a pixel whose threshold value is determined to be unprovidable. It should be noted that this step has the same processing as that in Step 501 in the flow of FIG. 5 in the first embodiment.

In Step 1102, the threshold provision determination unit 401 performs a second determination. The second determination is to perform threshold provision allowance determination processing by focusing on a specific area (here, the area of 4×4 pixels) of the input image, which is further divided into a specific area (here, the area of 2×2 pixels) of a target. Specifically, with reference to FIG. 10, in the case where the area A is a target area of processing, for example, the threshold provision determination unit 401 checks all pixel values in A1 to A4. Then, if all the pixel values in A1 to A4 are 0, the area A is determined to be an area whose threshold is providable, and if at least one pixel value that is greater than 0 exists, the area A is determined to be an area whose threshold is unprovidable. The same applies to the other areas B to D.

In FIG. 12, a second after-determination threshold matrix 1202 is a matrix that reflects the result of a second determination in the input image 1230 on the fiducial threshold matrix 1200. In the second after-determination threshold matrix 1202, where a broken-lined portion 1203 is assumed to be the processing area of 4×4 pixels shown in FIG. 10, the area A and the area C have pixel values of 0 for all four pixels (A1 to A4 and C1 to C4), and thus, those areas are determined to be areas whose thresholds are providable (white). In contrast, the area B and the area D include pixel values of 50 for some pixels (B1 and B3 as well as D1 and D3), and thus, those areas are determined to be areas whose thresholds are unprovidable (grey).

Going back to FIG. 11, in Step 1103, the threshold determination unit 402 tentatively determines a new threshold value for the fiducial threshold matrix 1200. To be more specific, with respect to individual processing areas (4×4 pixels) of the second after-determination threshold matrix 1202, a corresponding pattern among the 16 patterns shown in FIG. 13 is correlated to tentatively determine a new threshold value.

Figure 13:
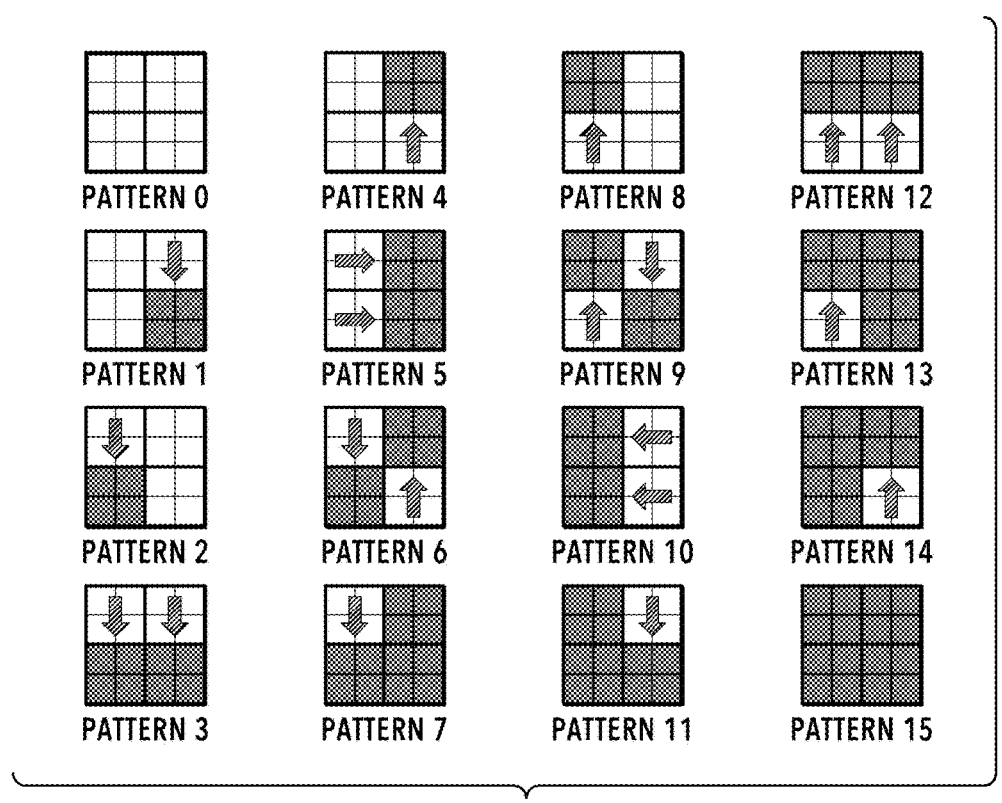
FIG. 13 is a diagram showing an example of patterns to be referred to by a threshold determination unit.

FIG. 13 is a diagram showing an example of patterns to be referred to by the threshold determination unit 402 at the time of tentatively determining a new threshold value in Step 1103. In FIG. 13, 2×2 pixels shown in white in each pattern indicate an area whose threshold is determined to be providable in Step 1102, and 2×2 pixels shown in grey indicate an area whose threshold is determined to be unprovidable. An arrow in each pattern represents a direction to provide a threshold value.

For instance, the 4×4 pixel area of the broken-lined portion 1203 in the second after-determination threshold matrix 1202 shown in FIG. 12 is correlated to pattern 5 among the 16 patterns shown in FIG. 13. In this case, with reference to FIG. 10 again, threshold values are provided from the area A to the area B and threshold values are provided from the area C to the area D. To be more specific, a threshold value of A1 is compared with a threshold value of B1, and the smaller one is tentatively determined to be a new threshold value for B1. Further, the same processing is made for A2 and B2, A3 and B3, and A4 and B4 to tentatively determine new threshold values for the area B. In addition, the same processing is made for the area C and the area D to tentatively determine new threshold values for the area D. A tentative threshold matrix 1204 shown in FIG. 12 is a matrix that reflects the result of new-threshold tentative determination processing in Step 1103 on the fiducial threshold matrix 1200, which includes circled values representing tentatively determined new threshold values.

Going back to FIG. 11, in Step 1104, the threshold determination unit 402 finally determines a new threshold value for the fiducial threshold matrix 1200. To be more specific, the result of the first determination processing performed in Step 1101 is reflected on the tentative threshold matrix 1204 generated in Step 1103 to obtain a third after-determination threshold matrix 1205. Then, with respect to the individual processing areas (2×2 pixels) of the third after-determination threshold matrix 1205, a corresponding pattern is correlated among the patterns shown in FIG. 7 to finally determine new threshold values. The values are further changed to generate a third threshold matrix 1208.

In the case of the present example, the pattern 10 is correlated among the 16 patterns shown in FIG. 7. Then, threshold values in a column 1206 (grey) in the third after-determination threshold matrix 1205 are compared with threshold values in a column 1207 (white) adjacent to the right of the column 1206 by each pixel, and only if a threshold value in the column 1026 is greater than that in the adjacent pixel, such a threshold value is changed to the threshold value of the adjacent pixel. The third threshold matrix 1208 shown in FIG. 12 is a matrix that reflects the result of new-threshold final determination processing in Step 1104 on the tentative threshold matrix 1204, which includes double-circled values representing finally determined new threshold values in this step.

In Step 1105, the dither processing unit 403 performs quantization process using the third threshold matrix 1208 for the input image 1230 to obtain a fourth quantization result 1209. In the fourth quantization result 1209, a white pixel indicates a dot not to be printed (0) whereas a grey pixel indicates a dot to be printed (1). Then, the third new-threshold determination processing is finished.

In FIG. 12, the fourth quantization result 1209 which is the result of the third new-threshold determination processing is shown, together with a first quantization result 1220 and a second quantization result 1210. The first quantization result 1220 is a result of quantizing the input image 1230 by directly using the fiducial threshold matrix 1200. Meanwhile, the second quantization result 1210 is a result of quantizing the input image 1230 by using a first threshold matrix 1211, which has been generated beforehand using the first new-threshold determination processing described in the first embodiment.

Upon comparing the first quantization result 1220, the second quantization result 1210, and the fourth quantization result 1209, the second quantization result 1210 and the fourth quantization result 1209 have more printed dots compared to those in the first quantization result 903. In other words, in the case of adopting the present embodiment, break on a thin line can be suppressed compared to the case of adopting a conventionally typical dither method. In addition, further more dots are printed in the fourth quantization result 1209 compared to those in the second quantization result 1210.

According to the present embodiment, the third new-threshold determination processing may be adopted if emphasis on density is insufficient in the first new-threshold determination processing. To be more specific, in the case of a printing condition where the density of individual dots is relatively low such that, for example, a printing mode is set to have the short paper distance, the third new-threshold determination processing may be performed to prioritize suppression of break on a thin line. On the other hand, in the case of a printing condition where the density of individual dots is relatively high such that, for example, a printing mode is set to have the long paper distance, the first new-threshold determination processing may be performed so as to prevent density from being too high while suppressing break on a thin line.

According to the present embodiment as described above, by switching between the first threshold determination processing and the third threshold determination processing in accordance with a printing mode, it is possible to print a thin line of desired density without any break irrespective of any printing modes being set.

Incidentally, the two embodiments described above can also be combined with each other. In this case, a mode of adopting the third new-threshold processing described in the second embodiment is a mode in which the density of a thin line is most emphasized, and then followed by a mode of adopting the first new-threshold processing and a mode of adopting the second new-threshold setting processing according to the first embodiment in order. In such a case, to the new-threshold final determination processing performed in Step 1104 in the second embodiment, the second new-threshold determination processing of the first embodiment may also be introduced. Moreover, it is possible to further adjust emphasis on density in multiple stages by preparing quantization process that introduces the second new-threshold determination processing and quantization process that does not introduce the second new-threshold determination processing, or by preparing coefficients in various stages in the case of introducing the second new-threshold determination processing. If a coefficient is set to be smaller than 1 while introducing the second new-threshold determination processing, the density of a thin line can further be emphasized compared to the case of adopting the third new-threshold determination processing. In contrast, if a coefficient greater than 1 is used, the density of a thin line can be adjusted in a lower direction compared to the case of adopting the third new-threshold determination processing.

In any case, by preparing any one of the processing that does not apply the new-threshold determination processing, the first new-threshold determination processing, the second new-threshold determination processing, and the third new-threshold determination processing, along with an appropriate coefficient, a thin line of desired density can be printed without any break irrespective of any printing modes of FIG. 17 being set.

Third Embodiment

In the first embodiment and the second embodiment, descriptions have been given on examples of changing the degree of processing for a thin line for each of the plurality of printing modes by use of the first new-threshold determination processing and the second new-threshold determination processing so as to print a thin line of desired density without any break. According to the present embodiment, in order to print a thin line of desired density without any break, an example will be described on switching between applying or not applying processing on a thin line in accordance with a printing mode instead of changing the degrees.

As in the first embodiment, the present embodiment uses the printing system shown in FIG. 2 to perform image processing in accordance with the flowchart of FIG. 3. Then, in the quantization process in Step 306, either one of the quantization process based on the first threshold matrix generated by the first new-threshold determination processing or the quantization process based on the fiducial threshold value without applying the new-threshold processing is performed in accordance with a printing mode acquired in Step 302. Applying the quantization process based on the fiducial threshold value implies that processing to increase the density of a thin line is not to be applied.

Figure 18:
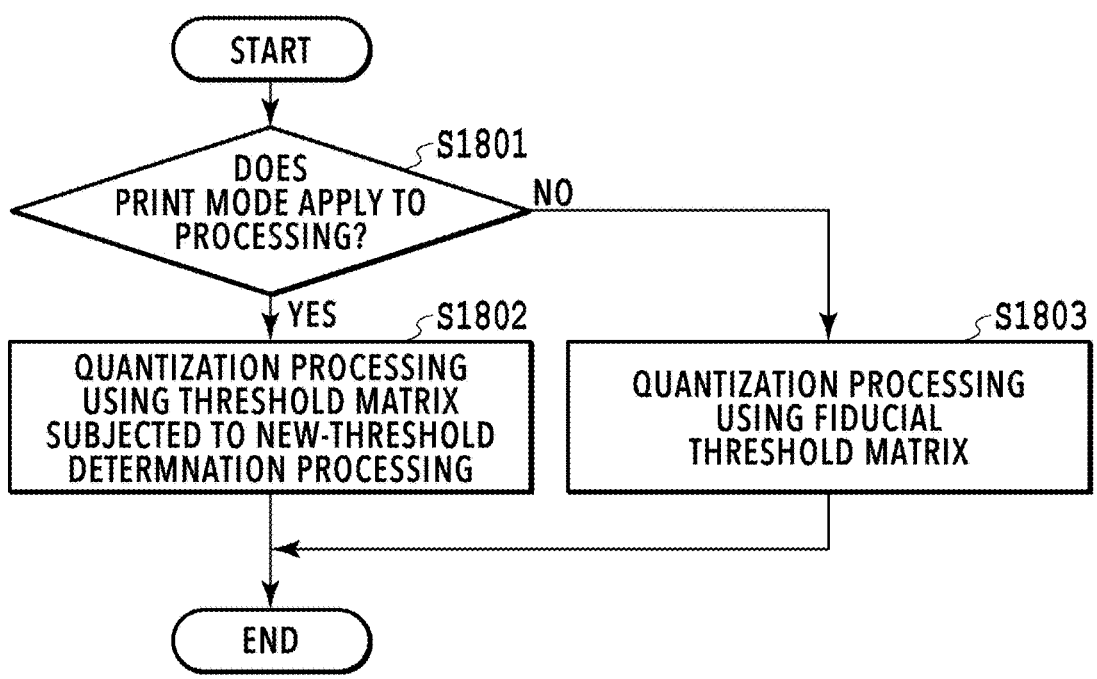
FIG. 18 is a flowchart for illustrating the steps of quantization process in a third embodiment.

FIG. 18 is a flowchart for illustrating the specific process of quantization process performed in Step 306 in the present embodiment. In Step 1801, it is determined whether a printing mode acquired in Step 302 is a printing mode applying the new-threshold processing.

FIG. 19 is a table showing correlation between printing modes acquired in Step 302 and applying or not applying new-threshold processing in referring to the case of determination in Step 1801. According to the table, in some printing modes that cause a concern in which the density of a thin line may be too high by applying the new-threshold processing, such new-threshold processing is not to be applied thereto.

For instance, in printing mode A and printing mode C having the same scanning speed of carriages, the new-threshold processing is applied to the printing mode A whose paper distance is 600 μm, but the new-threshold processing is not applied to the printing mode C whose paper distance is long as 1200 μm. This is because that the printing mode C whose paper distance is long is expected to increase the density of a thin line due to satellite compared to the printing mode A whose paper distance is short. Further, for instance, as for the printing mode D and the printing mode E having the same paper distance, the new-threshold processing is applied to the printing mode D whose scanning speed is 40 inch/sec, but the new-threshold processing is not applied to the printing mode E whose scanning speed is 60 inch/sec. This is because that the printing mode E whose scanning speed is high is expected to increase the density of a thin line due to satellite compared to the printing mode D whose scanning speed is low.

Going back to FIG. 18, in the case of determining to be in a printing mode to which the new-threshold processing is applied in Step 1801, the process advances to Step 1802 to perform quantization process in accordance with the threshold matrix generated by applying the new threshold determination processing. On the other hand, in the case of determining to be in a printing mode to which the new-threshold processing is not applied in Step 1801, the process advances to Step 1803 to perform quantization process in accordance with the fiducial threshold matrix. Then, this processing is finished. In the case of performing the quantization process in accordance with the fiducial threshold matrix, a burden on the quantization processing unit 400 can be alleviated compared to the quantization process in accordance with the threshold matrix generated by applying the new threshold determination processing.

According to the present embodiment, as described above, applying or not applying the first threshold determination processing is to be switched according to the printing mode. Accordingly, the burden of image data processing on the printing system can be alleviated while printing a thin line of desired density without visible break.

Incidentally, in the above description, the first new-threshold determination processing has been described as processing to be applied for an application mode of the new-threshold determination processing in the present embodiment, but it may be replaced with the second new-threshold determination processing, and further, it may also be replaced with the third new-threshold determination processing of the second embodiment. Alternatively, the first threshold determination processing, the second threshold determination processing, and the third threshold determination processing may be correlated with respect to the printing modes A, B, and D shown in FIG. 19, for the new-threshold determination processing respectively according to the level of emphasis on the density of a thin line.

In any case, if the quantization process applying the new-threshold determination processing and the quantization process not applying the new-threshold determination processing can be switched depending on the printing mode, it is possible to print a thin line of desired density without any break irrespective of any printing modes being set.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-095940 filed May 12, 2017, which is hereby incorporated by reference wherein in its entirety.

What is claimed is:

1. An image processing apparatus comprising:
a comparing unit configured to compare a signal value of a pixel with a threshold value at a position corresponding to the pixel in a threshold matrix that is composed of different threshold values arranged therein, to set whether to print or not to print a dot for the pixel, a first threshold generation unit configured to generate a first threshold value corresponding to a specific pixel area by changing part of threshold values corresponding to the specific pixel area of a fiducial threshold matrix based on the signal value such that the number of dots to be printed for the specific pixel area is greater than a case of using threshold values of the fiducial threshold matrix;

a second threshold generation unit configured to generate a second threshold value corresponding to the specific pixel area by changing part of threshold values of the fiducial threshold matrix based on the signal value such that the number of dots to be printed for the specific pixel area is greater than the case of using threshold values of the fiducial threshold matrix and is smaller than a case of using the first threshold value; and a determination unit configured to determine whether the comparing unit sets printing or not printing a dot using the first threshold value or the comparing unit sets printing or not printing a dot using the second threshold value for the specific pixel area.

2. The image processing apparatus according to claim 1, wherein,
in a case where, in the fiducial threshold matrix, a threshold value corresponding to a pixel whose signal value is a predetermined value or less is smaller than a threshold value corresponding to another pixel included in the specific pixel area, the first threshold generation unit changes the threshold value corresponding to the another pixel included in the specific pixel area to the threshold value corresponding to the pixel whose signal value is the predetermined value or less, and in a case where, in the fiducial threshold matrix, a value obtained by multiplying a threshold value corresponding to a pixel whose signal value is a predetermined value or less by a coefficient greater than 1 is smaller than a threshold value corresponding to another pixel included in the specific pixel area, the second threshold generation unit changes the threshold value corresponding to the another pixel included in the specific pixel area to the value obtained by multiplying the threshold value corresponding to the pixel whose signal value is the predetermined value or less by the coefficient.

3. The image processing apparatus according to claim 1, wherein,
in a case where, in the fiducial threshold matrix, a value obtained by multiplying a threshold value corresponding to a pixel whose signal value is a predetermined value or less by a coefficient less than 1 is smaller than a threshold value corresponding to another pixel included in the specific pixel area, the first threshold generation unit changes the threshold value corresponding to the pixel included in the specific pixel area to the value obtained by multiplying the threshold value corresponding to the pixel whose signal value is the predetermined value or less by the coefficient; and in a case where, in the fiducial threshold matrix, a threshold value corresponding to a pixel whose signal value is a predetermined value or less is smaller than a threshold value corresponding to a pixel included in the specific pixel area, the second threshold generation unit changes the threshold value corresponding to the another pixel included in the specific pixel area to the threshold value corresponding to the pixel whose signal value is the predetermined value or less.

4. The image processing apparatus according to claim 1, wherein,
- in a case where, in the fiducial threshold matrix, a threshold value corresponding to a pixel which is adjacent to a pixel included in the specific pixel area and whose signal value is a predetermined value or less is smaller than a threshold value corresponding to the pixel included in the specific pixel area, the first threshold generation unit changes the threshold value corresponding to the pixel included in the specific pixel area to the threshold value corresponding to the pixel which is adjacent to the pixel included in the specific pixel area and whose signal value is the predetermined value or less; and
- in a case where, in the fiducial threshold matrix, threshold values of pixels corresponding to a second pixel area composed of a plurality of pixels which is adjacent to a first pixel area composed of a plurality of pixels included in the specific pixel area and whose signal values are the predetermined value or less are smaller than respective threshold values corresponding to pixels included in the first pixel area, the second threshold generation unit changes the threshold values corresponding to the first pixel area to the threshold values corresponding to the second pixel area respectively, and then,
- in a case where a threshold value corresponding to a pixel which is adjacent to a pixel included in the specific pixel area and whose signal value is the predetermined value or less is smaller than a threshold value corresponding to the pixel included in the specific pixel area, the second threshold generation unit changes the threshold value corresponding to a pixel included in the specific pixel area to the threshold value corresponding to the pixel which is adjacent to a pixel included in the specific pixel area and whose signal value is the predetermined value or less.

5. The image processing apparatus according to claim 1, wherein the predetermined value is 0.

6. An image processing apparatus comprising:
- a comparing unit configured to compare a signal value of a pixel with a threshold value at a position corresponding to the pixel in a threshold matrix that is composed of different threshold values arranged therein, to set whether to print or not to print a dot for the pixel,
- a first threshold generation unit configured to generate a first threshold value corresponding to a specific pixel area by changing part of threshold values corresponding to the specific pixel area of a fiducial threshold matrix based on the signal value such that the number of dots to be printed for the specific pixel area is greater than a case of using threshold values of the fiducial threshold matrix;
- a second threshold generation unit configured to prepare a threshold value of the fiducial threshold matrix as a second threshold value of a second threshold matrix; and
- a determination unit configured to determine whether the comparing unit sets printing or not printing a dot using the first threshold value or the comparing unit sets printing or not printing a dot using the second threshold value for the specific pixel area.

7. The image processing apparatus according to claim 1, wherein
the determination unit determines to use the first threshold value in a case where density of a dot represented on a print medium is a first density, and determines to use the second threshold value in a case where density of a dot represented on a print medium is a second density which is higher than the first density.

8. The image processing apparatus according to claim 1, wherein
the determination unit determines to use the first threshold value in a case where a distance between an inkjet print head for printing dots and a print medium is a first distance, and determines to use the second threshold value in a case where the distance between the inkjet print head and the print medium is a second distance which is longer than the first distance.

9. The image processing apparatus according to claim 1, wherein
the determination unit determines to use the first threshold value in a case where a scanning speed with respect to a print medium of an inkjet print head that prints a dot is a first speed, and determines to use the second threshold value in a case where the scanning speed of the inkjet print head with respect to a print medium is a second speed which is higher than the first speed.

10. An image processing method comprising the steps of:
- comparing a signal value of a pixel with a threshold value at a position corresponding to the pixel in a threshold matrix that is composed of different threshold values arranged therein, to set whether to print or not to print a dot for the pixel;
- generating a first threshold value corresponding to a specific pixel area by changing part of threshold values corresponding to the specific pixel area of a fiducial threshold matrix based on the signal value such that the number of dots to be printed for the specific pixel area is greater than a case of using threshold values of the fiducial threshold matrix;
- generating a second threshold value corresponding to the specific pixel area by changing part of threshold values of the fiducial threshold matrix based on the signal value such that the number of dots to be printed for the specific pixel area is greater than the case of using threshold values of the fiducial threshold matrix and is smaller than a case of using the first threshold value; and
- determining whether the comparing step sets printing or not printing a dot using the first threshold value or the comparing unit sets printing or not printing a dot using the second threshold value for the specific pixel area.

11. An image processing method comprising:
- comparing a signal value of a pixel with a threshold value at a position corresponding to the pixel in a threshold matrix composed of different threshold values arranged therein, to set whether to print or not to print a dot for the pixel;
- generating a first threshold value corresponding to a specific pixel area by changing part of threshold values corresponding to the specific pixel area of a fiducial threshold matrix based on the signal value such that the number of dots to be printed for the specific pixel area is greater than a case of using threshold values of the fiducial threshold matrix;
- generating a second threshold value by preparing a threshold value of the fiducial threshold matrix as a second threshold value of a second threshold matrix; and
- determining whether the comparing step sets printing or not printing a dot using the first threshold value or the comparing step sets printing or not printing a dot using the second threshold value for the specific pixel area.

12. A non-transitory computer-readable storage medium storing a program for causing one or more processors to perform as an image processing apparatus, the program comprising code to execute:

comparing a signal value of a pixel with a threshold value at a position corresponding to the pixel in a threshold matrix that is composed of different threshold values arranged therein, to set whether to print or not to print a dot for the pixel;

generating a first threshold value corresponding to a specific pixel area by changing part of threshold values corresponding to the specific pixel area of a fiducial threshold matrix based on the signal value such that the number of dots to be printed for the specific pixel area is greater than a case of using threshold values of the fiducial threshold matrix;

generating a second threshold value corresponding to the specific pixel area by changing part of threshold values of the fiducial threshold matrix based on the signal value such that the number of dots to be printed for the specific pixel area is greater than the case of using threshold values of the fiducial threshold matrix and is smaller than a case of using the first threshold value; and determining whether the comparing sets printing or not printing a dot using the first threshold value or the comparing sets printing or not printing a dot using the second threshold value for the specific pixel area.

* * * * *